United States Patent [19]

Thessin et al.

[11] Patent Number: 5,452,299

[45] Date of Patent: Sep. 19, 1995

[54] OPTIMIZED TRANSFER OF LARGE OBJECT DATA BLOCKS IN A TELECONFERENCING SYSTEM

[75] Inventors: Tyler R. Thessin, Portland; Lewis V. Rothrock, Beaverton, both of Oreg.

[73] Assignee: Intel Corporation, Santa Clara, Calif.

[21] Appl. No.: 137,319

[22] Filed: Oct. 14, 1993

[51] Int. Cl.[6] .......................................... H04Q 11/04
[52] U.S. Cl. ...................... 370/62; 379/158; 379/202
[58] Field of Search .............. 370/62, 94.1, 60, 79, 370/85.6; 379/202, 204, 158

[56] References Cited

U.S. PATENT DOCUMENTS

| | | | |
|---|---|---|---|
| 4,479,195 | 10/1984 | Herr et al. | 370/62 |
| 4,479,211 | 10/1984 | Bass et al. | 379/202 |
| 5,127,001 | 6/1992 | Steagall et al. | 370/62 |
| 5,212,724 | 5/1993 | Nazarenko et al. | 370/60 |
| 5,323,445 | 6/1994 | Nakatsuka et al. | 370/62 |

OTHER PUBLICATIONS

Nascimento and Dollimore, *Journal of Object-Oriented Programming*, vol. 5, No. 5, 25–33 (1992).

*Primary Examiner*—Douglas W. Olms
*Assistant Examiner*—Shick Hom
*Attorney, Agent, or Firm*—Blakely, Sokoloff, Taylor & Zafman

[57] ABSTRACT

A method and apparatus for communication between agents in an electronic conferencing system is disclosed. In an electronic conferencing system wherein data is shared between a plurality of participants during an electronic conference, a method is disclosed for transferring large object data blocks among the participants during the electronic conference comprising the following steps: a) receiving an asynchronous request for large object data; b) placing the request in a request queue; c) receiving an asynchronous request for reprioritization of the request queue; d) determining a transport medium capability; e) partitioning the large object data into data blocks, a size of the data blocks being variable and corresponding to the capability of the transport medium; f) transferring the requested large object data to each of the participants via the transport medium; and g) removing the request from the request queue upon completion of the step of sending the requested large object data.

44 Claims, 23 Drawing Sheets

ORIGINAL OBJECT FOR
AGENT REASSIGNMENT

BACKGROUND TRANSFER MANAGER (BTM) — 1310

| PARTICIPANT CONNECTION/ DISCONNECTION CONTROL LOGIC 1312 | REQUEST PROCESSING LOGIC 1314 | DATA TRANSFER PROCESSING LOGIC 1316 |
|---|---|---|
| CLEAR-TO-SEND LIST 1318 | OUT-GOING TRANSFER LIST 1320 | IN-COMING TRANSFER LIST 1322 |

FIG. 13

| TRANSFER QUEUE ENTRY | |
|---|---|
| | 1610 |
| REFERENCE TO BLOB OBJECT | 1612 |
| NEXT TRANSFER OFFSET 1614 | REMAINING TRANSFER SIZE 1616 |
| RECIPIENT LIST | 1618 |
| PREVIOIUS TRANSFER QUEUE ENTRY | 1620 |
| NEXT TRANSFER QUEUE ENTRY | 1622 |

FIG. 16

OPTIMIZED TRANSFER OF LARGE OBJECT DATA BLOCKS IN A TELECONFERENCING SYSTEM

BACKGROUND OF THE INVENTION

1. Field of the Invention

The present invention is related to teleconferencing systems. More specifically, the present invention is related to mechanisms for communicating data among a plurality of participants in an electronic conferencing system.

2. Background Information

One of the more developing areas of computer networking is the field of electronic conferencing. Conferencing provides the ability to have an electronic on-line "meeting" between a plurality of users on computer systems in a variety of locations. Users at a variety of sites may communicate with one another as if they were in the same room. Using such application programs, modern communication systems have enabled the ability to have a meeting wherein all users participate in the meeting through their individual computer systems and share data, graphics, text and other types of information. Users may communicate with one another sharing data in the form of graphical images, text or other annotations and other information represented on the computer system display. This is analogous to a meeting where participants in a face-to-face meeting may display information to one another on a white or blackboard and other participants may add annotations, delete or otherwise modify the board. It is also anticipated that as bandwidth of communication media improves and compression standards for graphical data also become more robust that video data may also be shared among a plurality of connected users during such teleconferences.

One of the requisites of an electronic conferencing system is the need to replicate the same data on all users' displays participating in the conference. Such systems typically implement this capability in a variety of ways. The most common is the client/server model wherein a single connected node acts as a "server" of other nodes in the system and the remaining nodes connected in the conference act as slaves or clients to the server process. Thus, each of the clients merely receive data from the central machine to update their displays. Such systems, however, are entirely dependent upon the service being provided by the server and the throughput of the communication medium. Obviously, systems wherein the clients merely act as displays and inputs for user requests suffer from severe performance problems due to resulting updates of data from the server, which is typically handled serially by the server.

Another prior art solution for maintaining all of a participant's display in a conferencing system synchronous rely on a distributed client/server system. In a distributed client/server approach a shared object structure is kept on the server and clients are made aware of changes of that distributed information through alerts or demons. The disadvantage of this approach, similar to the centralized client/server approach is the reliance on the architecture itself. This includes a data conferencing application which must be able to connect several users over a phone line from point to point without requiring access to a centralized common server.

In the client/server approach, moreover, performance suffers greatly because requests to add or delete objects such as annotations, graphical images or other information on a participant's display is entirely dependent upon communication from the server. Thus, real-time performance severely suffers in prior art client-/server models since approval to act and manipulate upon objects on a participant's display is entirely dependent upon a whole set of dependent variables such as the number of requests to the server pending, the throughput of the communication medium, the number of participants connected, etc.

Yet another prior art approach for maintaining synchronicity of a plurality of participants in a conferencing system is the use of a distributed object-oriented system. This is a generalized approach which relies upon extensions, in one prior art solution, of the SmallTalk language itself. In this prior art system, "local" objects send messages to "proxy" objects which are local representatives for objects in the "shared" object space. The proxy objects communicate with the real objects through an RPC (Remote Procedure Call) mechanism. RPC is a protocol governing the method with which an application activates processes on other nodes and retrieves the results. Such a conventional mechanism is defined by Sun Microsystems, Inc. and described in RCF-1057 that provides a standard for initiating and controlling processes on remote or distributed computer systems.

The problem with this approach is in its generality which requires extensive support for sharing any object while making no assumptions about the behavior of objects. This has two disadvantages. First, a complex "SmallTalk system" is needed to support the distribution of objects in general. Second, the concurrency problem for any object is difficult because multiple participants may have different objects in their systems and such different objects may not be able to be communicated to the remaining users.

Yet another of the disadvantages of prior art data conferencing systems is their ability to support the transfer of very large blocks of information. Typically, such systems have relied upon point-m-point communication schemes wherein individual nodes such as the server, in the client/server model, must transmit the information from one individual node to the server and then from the server to the remaining participants' systems. Also, the transfer of very large pieces of data, such as files and/or images or other data, consumes lots of resources in the system and bandwidth of the communication medium. Thus, prior art conferencing systems suffer from severe performance penalties caused by the amount of data which may be transmitted within the system during a teleconference.

Thus, prior art data conferencing systems suffer from many disadvantages.

SUMMARY AND OBJECTS OF THE PRESENT INVENTION

The present invention relates to methods and apparatus for communication between agents in an electronic conferencing system. In an electronic conferencing system wherein data is shared between a plurality of participants during an electronic conference, a method is disclosed for transferring large object data blocks among the participants during the electronic conference comprising the following steps: a) receiving an asynchronous request for large object data; b) placing the request in a request queue; c) receiving an asynchronous request for reprioritization of the request queue; d) determining a transport medium capability; e) partitioning the large object data into data blocks, a size of the data blocks being variable and corresponding to the capability of the transport medium; f) transferring the requested large object data to each of the participants via the transport medium; and g) removing the request from the request queue upon completion of the step of sending the requested large object data.

One of the objects of the present invention is to provide a data conferencing system wherein real-time performance of individual participants in a data conferencing system do not suffer from performance problems due to medium throughput.

Another of the objects of the present invention is to provide an improved data conferencing system which enable users to have more or less real-time response from their individual systems in the conference.

Another of the objects of the present invention is to overcome the prior art disadvantages of the client-/server model provided in certain conferencing applications.

Another of the objects of the present invention is to provide a system which provides concurrency among a plurality of participants in a conferencing application, however, not having the attendant disadvantages of real-time impacts upon performance due to such demands of concurrency.

Another of the objects of the present invention is to provide the capability to transfer very large pieces of data without impacting upon real-time performance of users in a conferencing application program.

Other objects, features and advantages of the present invention will be apparent from viewing the figures and the description which follows below.

BRIEF DESCRIPTION OF THE DRAWINGS

The present invention is illustrated by way of example and not limitation in the figures of the accompanying in which like references indicate similar elements and in which:

FIG. 13 illustrates the Background Transfer Manager architecture.

FIG. 16 illustrates a transfer queue entry.

DETAILED DESCRIPTION

The present invention relates to methods and apparatus for communication between agents in an electronic conferencing system. Although present invention will be described with reference to specific signal names, formats, time intervals and other specific information, these are to be viewed to be used for illustration purposes only and not to be construed as limiting the present invention. It can be appreciated by one skilled in the art that many departures and modifications may be made without departing from the overall spirit and scope of the present invention.

Figure 1A:
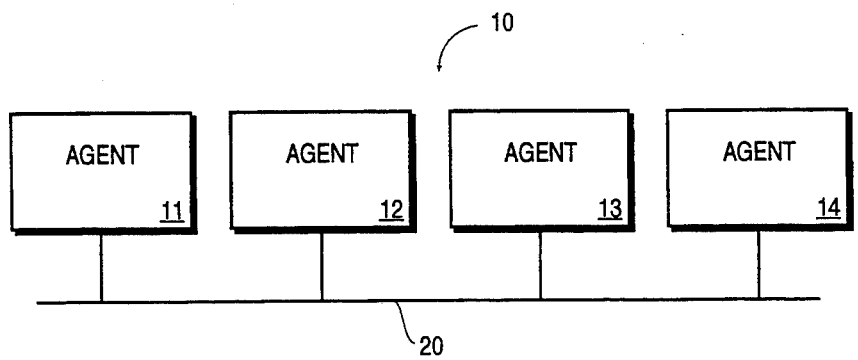
FIG. 1a illustrates a topology of a system in which various agents may be connected in a conferencing system.

As illustrated in FIG. 1a, a communication system may comprise a plurality of agents such as 11–14 which are all coupled to a communication medium, e.g., 20 illustrated in FIG. 1a. In certain embodiments of the present invention, each individual agent coupled to the medium 20 has equivalent capabilities to provide communication between the agents. The implemented conferencing system uses a distributed approach wherein each of the agents 11–14 maintains local copies of the conferencing structure (called a "meeting") which shall be consistent with one another. In addition, one of the agents 13, in one embodiment of the present invention, acts as an arbitrator to grant requests to add objects to various structures within each agent to maintain consistency among the displayed objects on each of the agents' systems. The system used in various embodiments of the present invention uses a distributed architecture, wherein each agent 11–14 maintains local copies of all the objects being used in the electronic conference. Thus, displays, text, graphics and other information displayed on the agents' computer system displays are represented in data structure maintained in each of the systems' local memory and/or media devices coupled to those systems. Thus, the present system comprises a hybrid of the client/server architecture wherein, instead of maintaining centralized copies of all the objects in the electronic conferencing system, each agent maintains a local copy of the data so that changes to the data may be more or less immediate. The structure of one agent, which may be coupled to the communication medium such as 20 illustrated in FIG. 1a, is illustrated with reference to FIG. 1b.

Figure 1B:
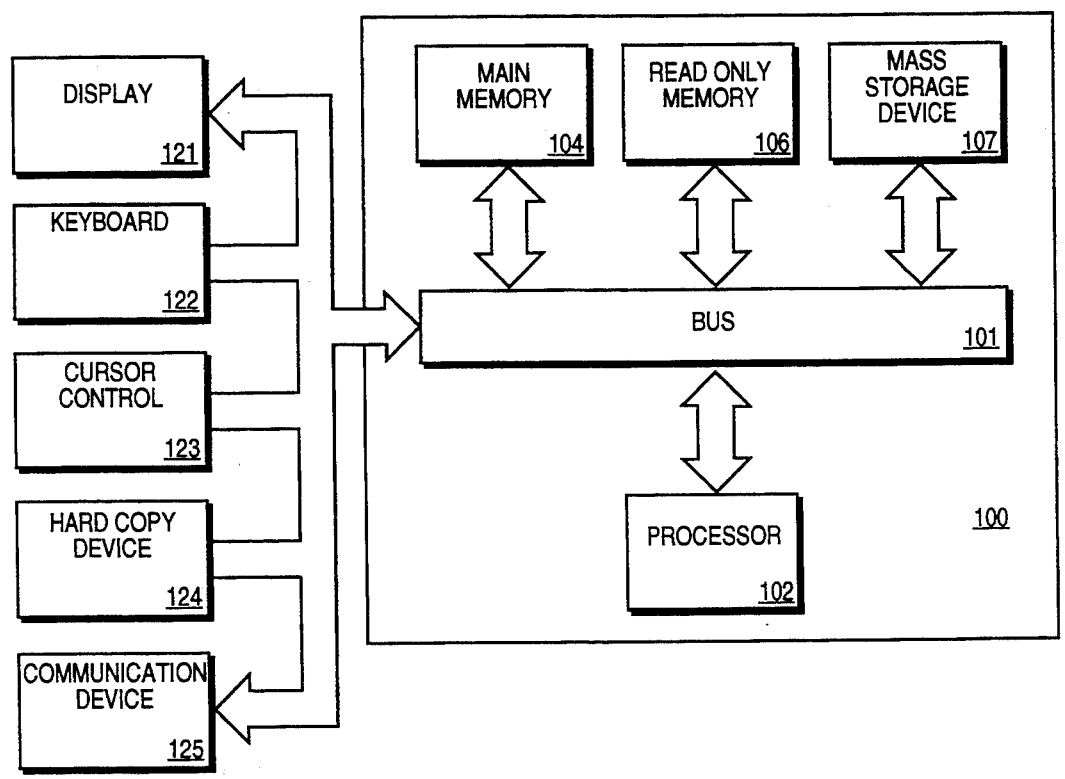
FIG. 1b illustrates a block diagram of circuitry contained in one agent participating in a conferencing system.

Referring to FIG. 1b, a system upon which one embodiment of an agent (e.g., 11 of FIG. 1a) of the present invention is implemented is shown as 100. 100 comprises a bus or other communication means 101 for communicating information, and a processing means 102 coupled with bus 101 for processing information. System 100 further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. System 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. System 100 may further be coupled to a display device 121, such as a cathode ray tube (CRT) or liquid crystal display (LCD) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, stylus, or cursor direction keys, coupled to bus 101 for communicating direction information and command selections to processor 102, and for controlling cursor movement on display 121. Another device which may be coupled to bus 101 is hard copy device 124 which may be used for printing instructions, data, or other information on a medium such as paper, film, or similar types of media. In the described embodiments, another device which is coupled to bus 101 is a communication device 125 which is used for communicating with other agents. This communication device may include any of a number of commercially available networking peripheral devices such as those used for coupling to an Ethernet or Token-Ring communication medium. Note, also, that any or all of the components of system 100 and associated hardware may be used in various embodiments, however, it can be appreciated that any configuration of the system may be used for various purposes according to the particular implementation.

In one embodiment, system 100 is an IBM compatible type personal computer. Processor 102 may be one of the 80×86 compatible microprocessors, such as the 80386, 80486 or Pentium ™ brand microprocessor manufactured by Intel Corporation, Inc. of Santa Clara, Calif.

Note that the following discussion of various embodiments discussed herein will refer specifically to a series of routines which are generated in a high-level object-oriented programming language (e.g., the Microsoft C/C++) available from Microsoft, Inc. Redmond, Wash. This series of routines is compiled, linked, and then run as object code in system 100 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Software Organization of an Agent

Figure 2:
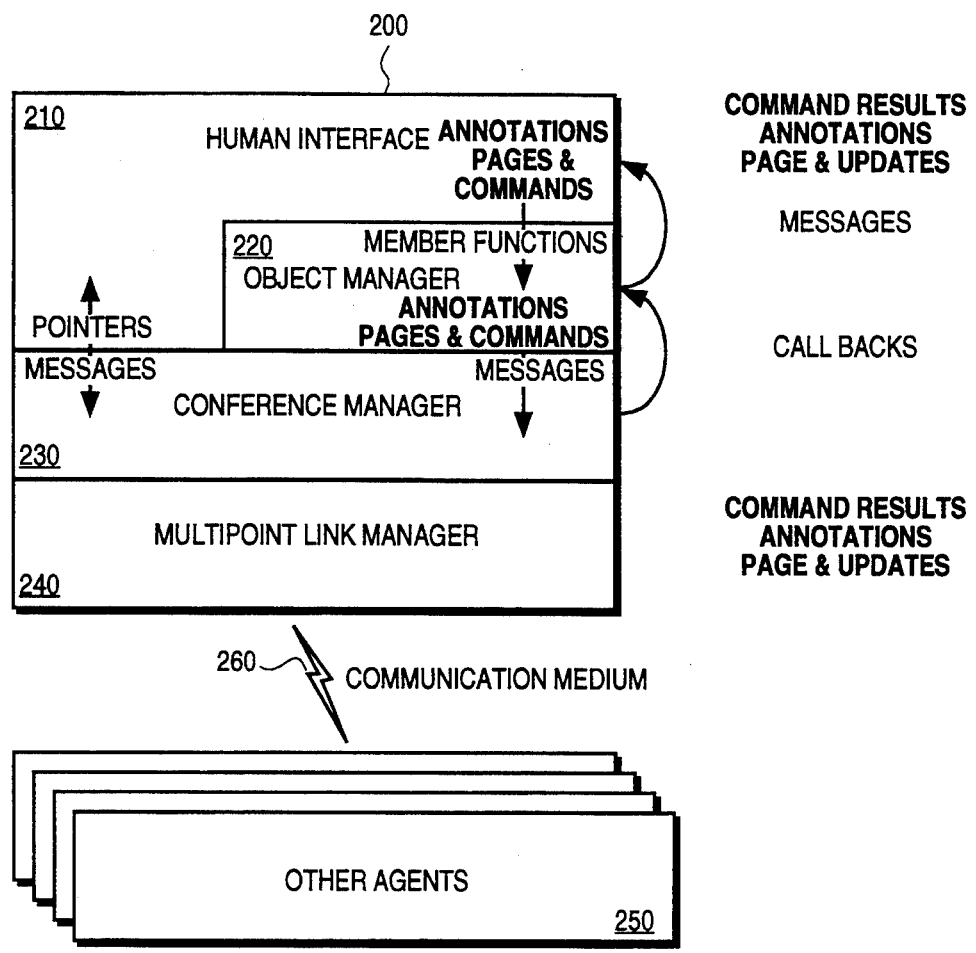
FIG. 2 illustrates a block diagram of the various control procedures which are present in an agent participating in a conference.

Operative within each agent during conference run time is a series of software procedures which are organized in the manner illustrated with reference to FIG. 2. FIG. 2 illustrates 200 which is a general block diagram of the organization of the processes within a single agent in one embodiment of the present invention. The software organization 200 within a single agent comprises a multi-point process 240 which is responsible for direct communication onto the communication medium 260 so that other agents 250 may be communicated with. This provides all the low-level communication functions which allow direct accessing communication medium 260. In different embodiments of the present invention, communication medium 260 may be any one of the various networking standards used including local area networks such as Ethernet, Token-Ring or other types of networking standards. Communication medium 260 may also be a telephone network and modem connection or other data communications medium. Multi-point function 240 thus provides all the necessary packetization and responses to communication received over communication medium 260.

The next higher level in the software organization 200 of a single agent is the conference manager 230 which provides all the necessary executive functionality for communication with the low level communication functions 240 and the higher level functions provided by the human interface process 210 and the object manager 220. The conference manager 230 controls the object manager 220 through a series of callbacks to commands in the conferencing system which are desired to be executed. Conference manager 230 also executes the callbacks in object manager 220 according to messages which are received from the communication process 240 and directs the creation, deletion or other action upon objects in the system. As will be described in more detail below, objects within the system such as annotations, pages, commands and other objects used within the system are treated using an object-oriented system wherein hierarchies of objects are defined. This will be described in more detail below.

Communication from object manager 220 to conference manager 230 is provided via messages which are passed to the multi-point link manager 240 for the creation of objects, arbitration between the arbitrator and the agent and communication with other agents in the conference. Moreover, conference manager 230 directs human interface process 210 via pointers to display various things on the display. Results from the display of human interface functions are passed back to the conference manager 230 via messaging.

Object manager 220 is a process which is operative during run time to keep track of the various objects used during a conference between the agent and other agents in the system. The object manager coordinates the meeting between the agents. The object manager keeps track of all objects created during the meeting, including, other agents, the various things displayed during the conference and other objects. In addition, the object manager is used for maintaining the status of the meeting and keeping all the other agents synchronized with the current agent. Contents of a meeting may be saved and retrieved from mass storage (e.g., 107 of FIG. 1b) when exiting or entering a conference. The object manager also exchanges meeting contents with other object managers in other agents to keep copies of the meeting synchronized.

Each object manager 220 maintains its own local copy of the meeting which is provided to human interface 210 as required. Object manager 220 informs human interface 210 about changes from other agents participating in the meeting. Human interface layer 210 then may adjust the display as directed. Human interface 210 also informs the object manager about changes that the user wishes to make to the current meeting. Object manager 220 then synchronizes the changes with all other object managers participating in the meeting. The object manager controls the human interface through messaging, as does the human interface direct the object manager to perform certain actions upon objects, according to the adjustment of the display under control of human interface 210. A brief overview of the structure of objects in one embodiment of present invention is illustrated with reference to FIG. 3.

Object Classification Structure

Figure 3:
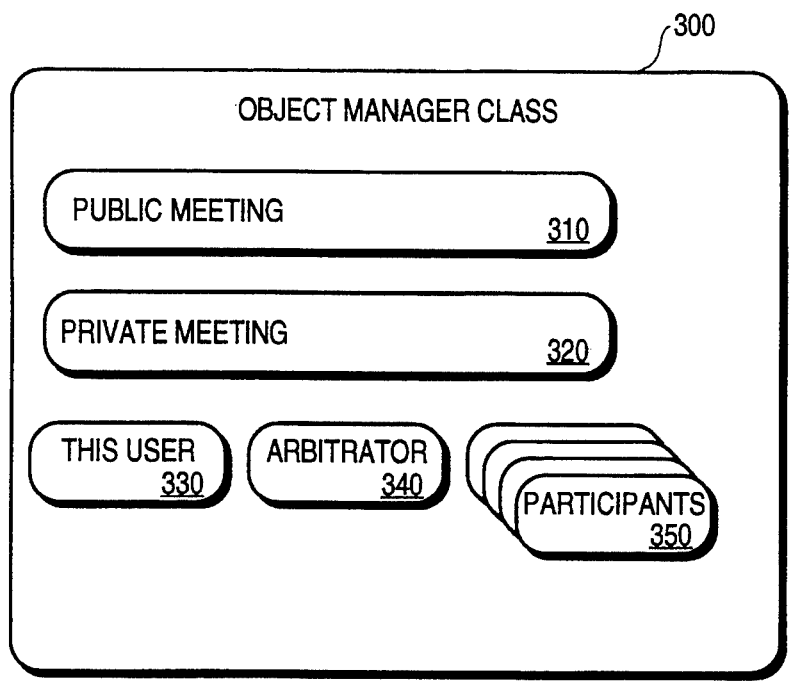
FIG. 3 illustrates a block diagram of classes used in one implemented embodiment of the present invention.

FIG. 3 illustrates a general classification of the high level objects which are used in one embodiment of the present invention. In this embodiment, the object manager class 300 comprises the broadest classification of objects within the system. Generally, within the object manager class, are two general areas, public meetings 310 and private meetings 320. The object manager maintains information that the user has entered into his private space in the private meeting object class 320 which is distinct from the public meeting object class 310. Each is maintained as a separate structure of objects within the meeting class. Therefore, during a public meeting stored in public meeting class 310, a user may similarly store private information 320 also to be associated with that same meeting.

In addition, object manager 220 maintains information about the user in classification 330 and arbitrator 340, of which there is only one during any one electronic conference and the other participants in the meeting in a participants classification 350. These are all also members of the object manager class. Object manager 300 keeps track of the participants in the meeting, such as when new participants join the meeting new participants' copies of the meeting are brought into synchronization with all of the other participants'. As participants leave the meeting, all of the users' contributions are ensured to be shared before the participant leaves the meeting.

One of the agents or participants in the meeting is known as the arbitrator. This is represented in the arbitrator class 340. The arbitrator resolves conflicts between users when question of control of meeting properties arise. The arbitrator determines which participant controls an annotation, how many pages exist in the present meeting, etc. It also keeps a master copy of the meeting that all other participants synchronize to. Object mangers within each agent or participant coordinate who the arbitrator is and assign a new arbitrator when the assigned arbitrator leaves the meeting or as dictated by other conference events-such as opening/merging a meeting file in which the participant opening/merging the meeting file becomes the arbitrator prior to opening/merging the file. In one implementation of the present invention, the first user to start a meeting is assigned the arbitrator.

Figure 4:
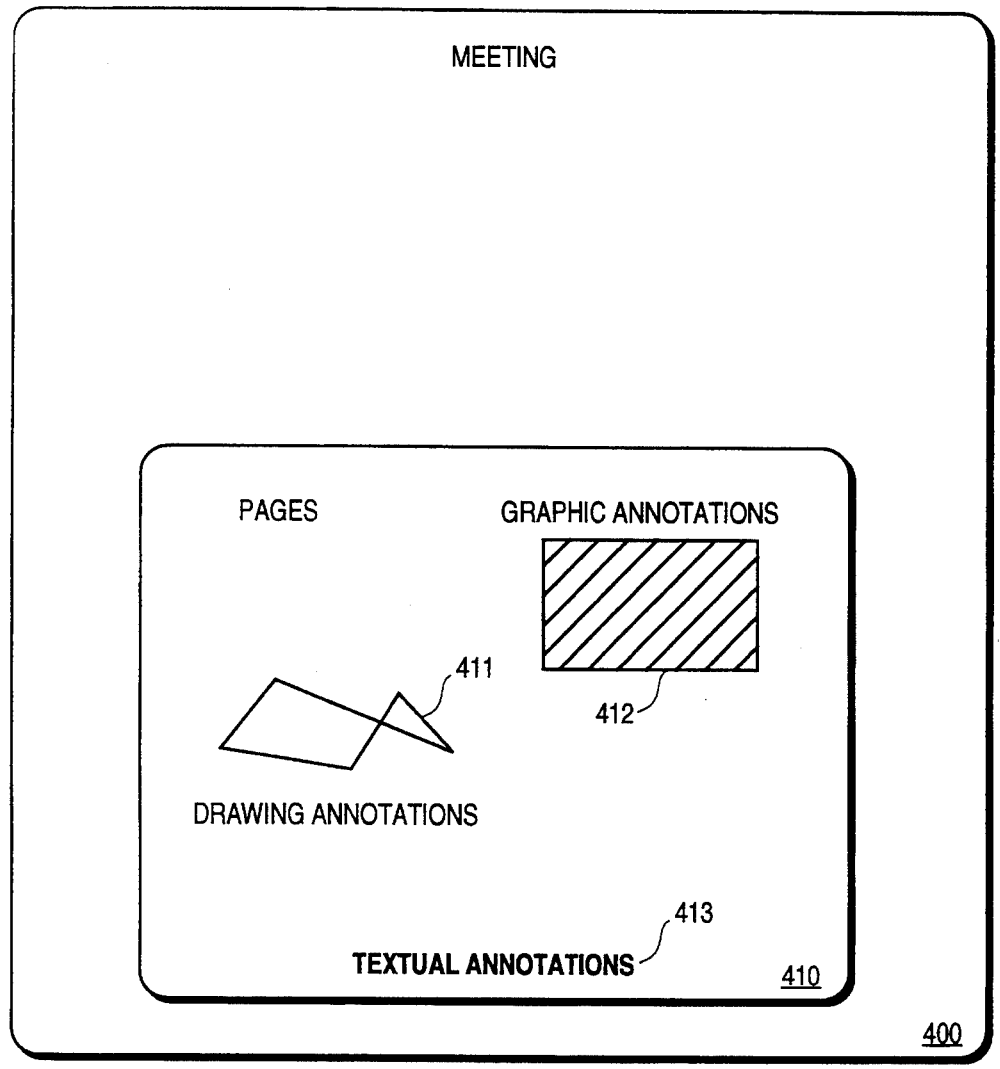
FIG. 4 illustrates the types of annotations which may be performed upon a user interface display of a single agent within various implementations of the preferred embodiment.
Figure 5:
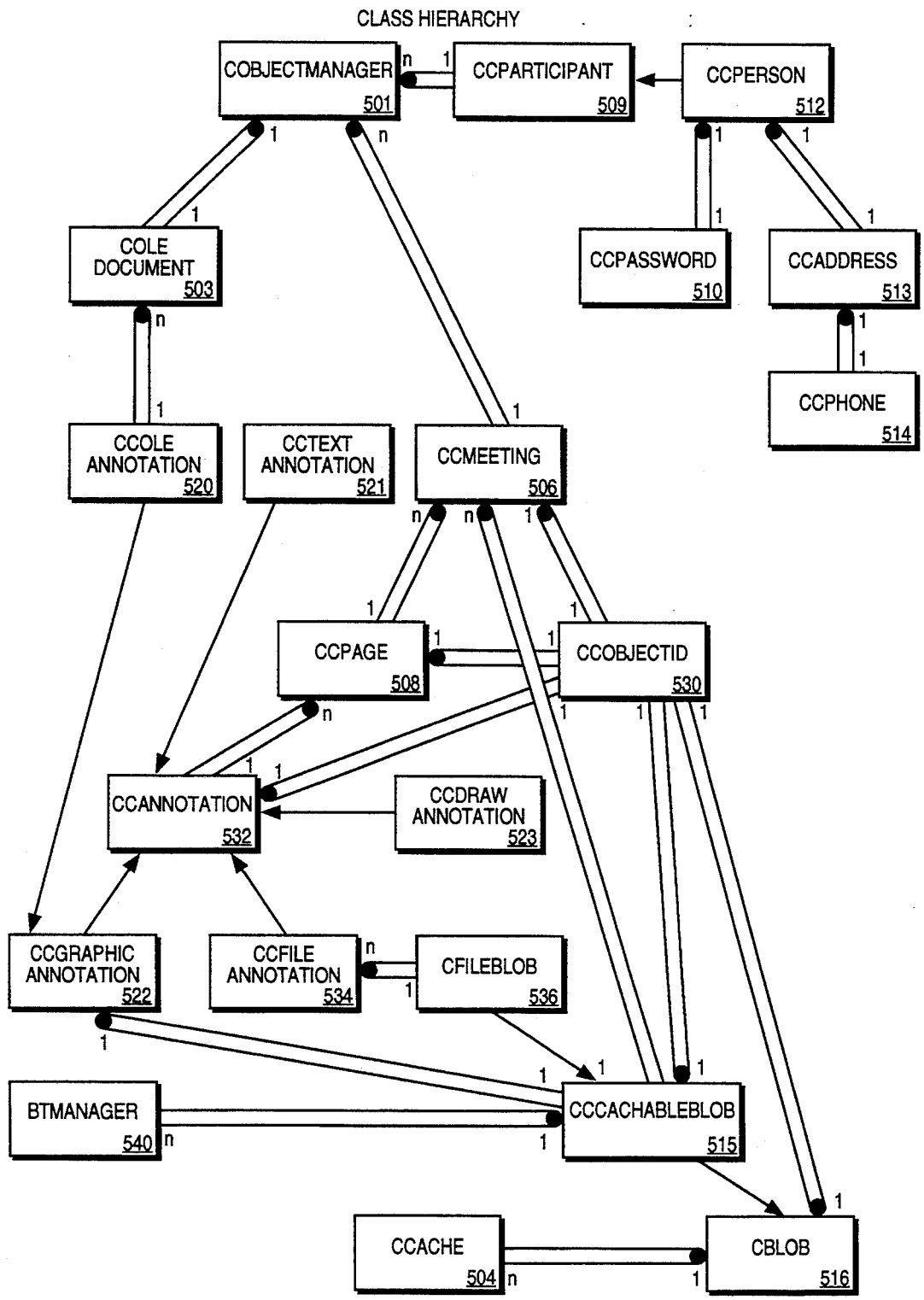
FIG. 5 illustrates the object hierarchy used in certain embodiments of the present invention.

A very rough approximation of the types of objects which may be present upon a participant's display is illustrated with reference to FIG. 4. Generally, a user will have a meeting area 400 on his display in which various information may be entered. Typically, each meeting comprises a series of pages which is analogous to a single white board or shared display space which users in a room could access. Analogously, one embodiment of the present invention uses the notebook metaphor which is, in fact, a shared "notebook" among a plurality of participants in the meeting into which every participant may enter information. The shared area or notebook comprises a plurality of pages 410 onto which annotations may be made. Users may create or delete pages at will, subject to certain conditions. Annotations on the pages may comprise one of at least four types, in one embodiment of the present invention. The first three of these types are illustrated in FIG. 4. For instance, a page 410 may comprise a drawing annotation 411 which is typically an object-oriented drawing created by a single user. Such object-oriented drawing illustrations as 411 comprise a description of point positions and segments between them and are well-known to those in the prior art. Annotations may also comprise graphic annotations 412 which are generally bit-map representations of graphic image data. Textual annotations 413 may be placed upon a page. Textual annotations can be any of the user's choosing and, including in certain prior art implementations, allowing users to choose style, point size, font and other formatting information as is typical in the prior art. One other annotation which may be used in one embodiment of the present invention is the OLE annotation using the Object Linking and Embedding (OLE) protocol available from Microsoft Corporation of Redmond, Wash. OLE annotations may reference other "objects" created and/or maintained by other application programs and which may be either linked or embedded using OLE. Each of these annotations is stored as an object under an "annotation" classification which is associated with objects in the page classification. FIG. 5 illustrates the classification for objects used in one embodiment of the present invention.

The overall structure of the object classes is illustrated with reference to FIG. 5. FIG. 5 includes the meeting object, user, arbitrator, participants and annotation objects which were discussed and illustrated with reference to FIGS. 3 and 4 above. In FIG. 5, relationships are illustrated with reference to the dotted line/solid bar representation wherein inheritance relationships are shown by the arrowhead with the direction of the inheritance following the orientation of the arrowhead. In addition, each of the relationships illustrated in the figures indicate multiple relationships. That is, if a relationship is n:1 that means that there may be n of the sub-class objects under the parent object. For example, as was illustrated and discussed with reference to FIG. 3 and now shown on FIG. 5, the CObjectManager 501 has two CCMeeting object classes: the "public" meeting and the "private" meeting shown in FIG. 3. In addition, the CCMeeting object class 506 has Participant objects 509 associated with it, those shown as 350 in FIG. 3. In addition, the CCMeeting object classification 506 references the CCPage object 508. The CCPage classification is used for defining all the pages which may fall under a specific meeting. Under the CCPage classification 508, am the annotation classifications (under the class CCAnnotation 532) which are shown with their various inheritance relationships in the lower section of the diagram. Thus, the CCAnnotation classification 532 may comprise objects inheriting all relationships of the annotation object, for text annotations contained within the class CCTextAnnotation 521, the CCGraphicAnnotation 522 for representing graphic or bitmap annotations such as 412 in FIG. 4 and the CCDrawAnnotation class 523 for referencing drawing annotations such as 411 shown in FIG. 4. One other annotation which may be used in one embodiment of the present invention is the CCOLEAnnotation class 520 which is part of the COLEDocument classification 503 for performing object linking and embedding using the Object Linking and Embedding (OLE) protocol available from Microsoft Corporation of Redmond, Wash. Annotations may, thus, be references to "objects" created and/or maintained by other application programs and which may be either linked or embedded using OLE.

Other classifications are available from the Object Manager, classification 501 such as the CCPerson classification 512 which is associated with a CCPassword classification 510 for associating user passwords with person objects. Also, each person has an associated CCAddress class 513 and a CCPhone class 514 for defining participant network addresses and/or access telephone numbers.

Finally, the remaining set of object classes shown in FIG. 5 includes the CCCachableBlob object classification 515 and the CCBlob class 516 which has a relationship and inherits characteristics from the annotation object classification and the CCCachableBlob object classifications 532 and 515. The CCBlob 516 is used for representing very large objects in various embodiments of the present invention. Various embodiments of the present invention allow very large binary objects, known in this embodiment as Binary Large Objects or BLOBs, which may be any type of data. These very large binary objects may also be shared and distributed among users. Further, various embodiments of the present invention allow for such objects to be transferred only upon demand of specific users and/or when medium traffic allows. In this manner, the communication medium is not burdened with the task of transmitting these very large binary objects, unless absolutely required. Very large binary objects or BLOBs may be used for representing any type of information, however, in certain embodiments they may only be used for representing large bitmap data or other graphical image data such as compressed animations or audio information such as those represented in MPEG (Motion Picture Experts Group)or JPEG (Joint Photographer's Experts Group) format. It is anticipated in alternative embodiments that other binary data may be transmitted using these techniques, including executable program data.

Overview of Operation of Deferred Synchronization

As already has been discussed, each of the participants in a conference maintains its own data regarding the current state of display of the shared notebook for all users in the conference. In this manner, no individual participant is dependent upon the accessing of a central server for the display of its own information. However, a special participant in the conference is known as the "arbitrator" and the arbitrator maintains an "official version" of a meeting. All other participants are required to keep their versions synchronized with the arbitrator's official copy. A second participant may become an arbitrator either upon its own request or upon the arbitrator desiring to cease participating in the conference. In this case, all other participants are also informed of the change and a new arbitrator can start functioning. In one embodiment of the present invention, the arbitrator of a conference is the original participant that began the meeting.

The arbitrator also acts as a central system upon which annotations in the official copy of the meeting structure are approved. Although users may make changes to their own local copies of the meeting structure in real-time, without authority from the arbitrator, in order for the meeting to be maintained as consistent among all the participants, the arbitrator must make a final decision about the position of certain annotations. The allowing of a single participant to modify its meeting structure without the authority of the arbitrator and the later synchronization of that meeting structure with the other participants in the conference will, for the remainder of this application, be referred to as deferred synchronization.

Associated with each page and annotation class object in the meeting structure is a variable indicating whether the page or annotation has been synchronized with other participants in the conference. This is known as the "blocked" flag and this flag is set true until the page or annotation object has been synchronized with the other participants. In addition, the arbitrator maintains and grants object indices to new objects as they are created and/or modified by a particular agent, thus keeping the entire meeting synchronized among all the participants. The agent then requesting the addition and/or modification of objects receives messages from the arbitrator indicating a new object index, so that the participant may update his local meeting structure to comply with the remaining participants in the meeting. In addition, the blocked flag may then be changed to false indicating that the objects in question are now synchronized and no further communication needs to be performed with the arbitrator for the present time.

For example, one participant may decide to add an annotation to an existing page. Human Interface process 210 detects this request and sends a message to object manager 220 in order to add the annotation. Then a request is sent by the object manager 220 of the requesting participant to the object manger of the arbitrator. In addition, the object manager will add an object to its local meeting structure with the flag indicating that the annotation is "blocked" indicating that the object has not been synchronized with other participants in the meeting. In addition, in the communication to the arbitrator, the participant has indicated its participant index and a request for an object index from the arbitrator. Then the user of the agent may continue operation upon the annotation, until the object index is received back from the arbitrator. Once the object index has been received, the participant may update its meeting structure to comply with the index received back from the arbitrator. A more detailed discussion of this will be shown and discussed with reference to FIGS. *6a*–*7e*.

Detail of Process for Deferred Synchronization

Figure 6A:
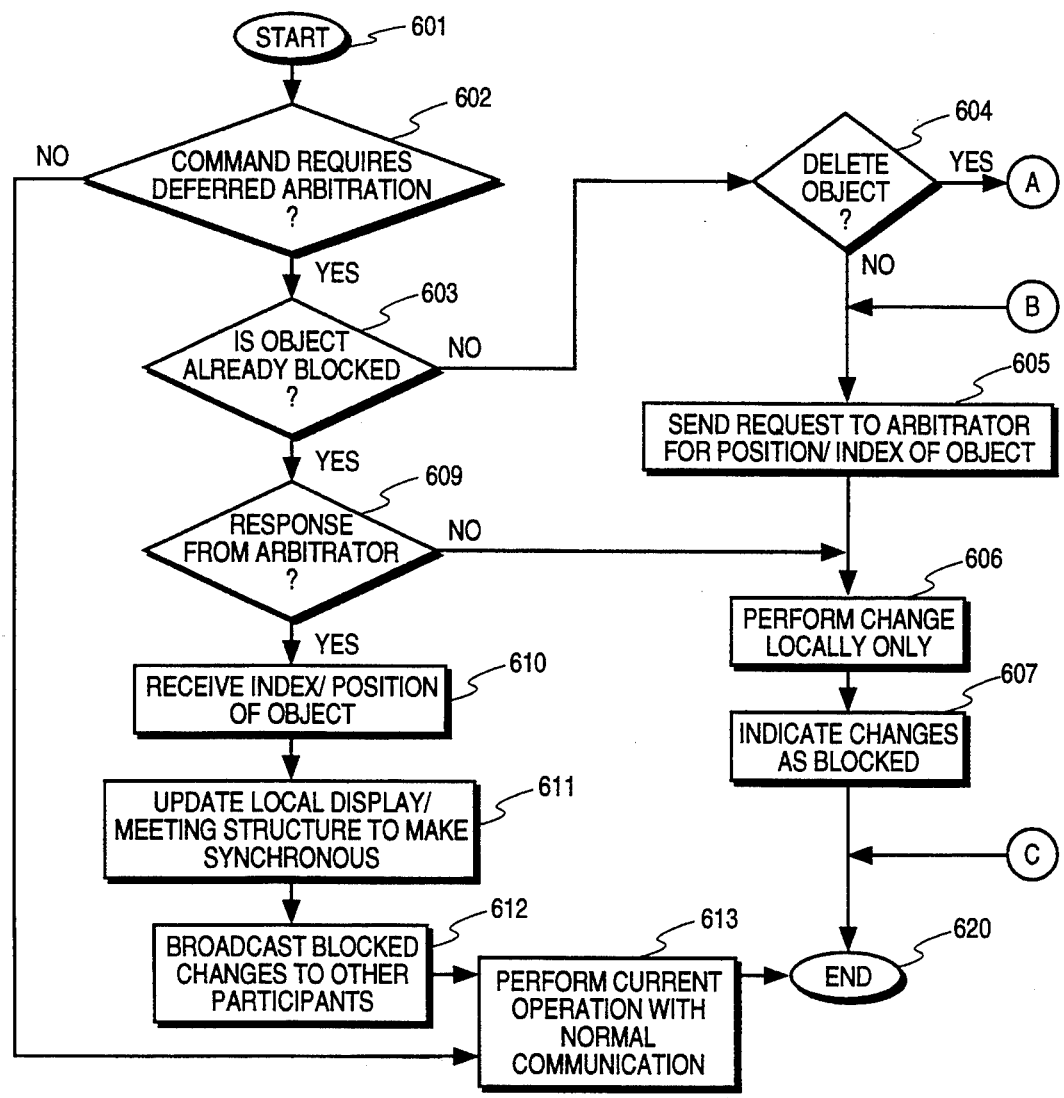
FIGS. 6a and 6b illustrate process-flow diagrams of a process performed upon detection of an event requiring the creation/deletion/modification of objects during an electronic conference which may be executed from an event loop of the object manager in one embodiment of the present invention.
Figure 6B:
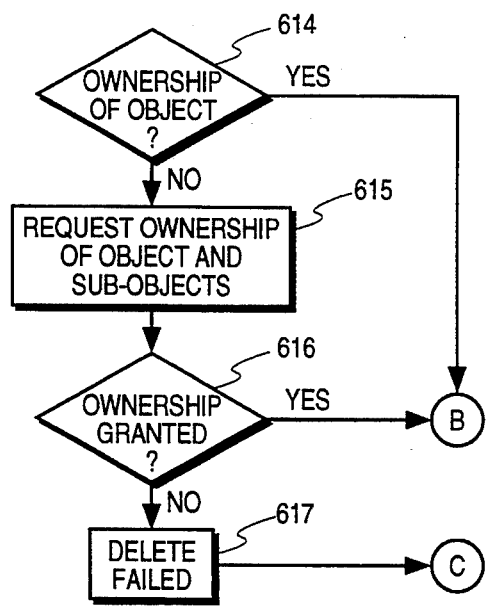

FIGS. 6a and 6b illustrate detailed process steps for a process 600 which may be executed upon the detection of a request to execute a command requiring synchronization with other participants in a meeting within the event loop of the conference manager. Thus, process 600 may be entered upon detection of a creation of a new object, modification of an existing object or the deletion of an object as detected by human interface 210 on FIG. 2. Process 600 may start at a typical process entry point such as 601 illustrated in FIG. 6a. Then, it is determined whether the command is one which requires deferred arbitration at step 602. If not, then the current operation may be performed with normal communication and the associated latency, if any, between the current agent and any other participants in the conference at step 613. Then, at step 620, process 600 may exit at a typical process exit point.

If, however, it was a command which requires deferred arbitration, that is, timing requirements for meeting synchronization are relaxed and the user may make any modifications to the local meeting structure without the latency incurred by synchronization with other agents and continues at step 603. At step 603 it is determined whether the current command has occurred to change an object which is already "blocked". An object will only be indicated as blocked if it has been determined that the object was previously modified, deleted or added and the object has not yet been synchronized with other participants in the conference. This flag, as already discussed, is only set upon detection of a change, but prior to the assignment of an object index by the arbitrator. If it is not blocked (e.g., this is an initial action upon the object), then at step 604, it is determined whether the request has been detected for a deletion of the object. Deletion requires a specific series of steps, since ownership of all the objects requested to be deleted must be acquired prior to any deletion. This process also requires communication with other participants in the conference as shown on FIG. 6b. First, at step 614, it is determined whether ownership of the object has been obtained. This includes ownership of all the objects and sub-objects. If not, then such ownership is requested from each of the owners of the objects at step 615. If ownership is granted, as detected at step 616, or ownership of the object had already been obtained as detected at 614, then the process may continue back at step 605 illustrated on FIG. 6a. If not, then the delete failed as indicated at step 617, and the process returns at a typical process exit point such as that shown as 620 in FIG. 6a.

At step 605 it has now been determined that the object is one which has previously not been blocked, that is, it has previously been synchronized, and now some sort of change is occurring to the object. Thus, when this occurs, a request must be sent to request an object index for the object in order for the participant to be synchronized with all the other participants. However, the user may continue to make changes and perform other operations even prior to the receipt of the object index from the arbitrator. Thus, changes will therefore be local only, until the later synchronization of the meeting structure of the requesting participant with other participants in the meeting. The requested changes by the user are performed locally only at step 606, making all changes to the meeting structure which are permissible, and the changes are indicated as blocked at step 607. Then, this sub-process within the event loop may be exited at step 620, a typical process exit point.

Process 600 continues through the initial steps, 601, 602 and 603 for blocked objects for which commands have been received. If the object is detected as "blocked", that is a request has been sent to the arbitrator for an object index, however, no response has yet been received the process 600 continues at step 609. Step 609 detects whether the response containing the object index has been received from the arbitrator. If not, then the process proceeds to steps 606, 607 and 620, as already discussed. That is, changes continue to be performed locally and any changes are indicated as blocked until the synchronization with the arbitrator and, thus, the other participants has occurred.

If, however, a response has been received from the arbitrator, then the object index is received at step 610. Then, the participant may update its local meeting structure at step 611 in order to make the participant synchronous with the arbitrator (and thus the other participants in the meeting). In addition, the Human Interface HI layer 210 is informed of this occurrence in order for the participant to update its display. For example, if a page had been added by the participant which the local participant assigned page 4, but the arbitrator now assigns to page 5, the human interface layer 210 detects this change and updates the display accordingly to move the page visually to page 5. For example, in the notebook metaphor shown on the display, a new page "tab" may be created for the page using well-known prior art user-interface commands to associate a new page tab labeled "Page 5" with the locally created page. Then, after its own local meeting structure and display have been modified at step 611, the participant broadcasts any of the blocked changes, that is changed pages or annotations, to the other participants in the conference at step 612 as requested by the participants. Therefore, none of the other participants is synchronous with the current participant until this time. Once this is accomplished, the other participants in the conference may also update their own local meeting structures and associated displays with the appropriate pages and annotations in order to be synchronous with the participant performing the change. Finally, the current operation then may be performed with normal communication at step 613, thus making all the participants synchronous in the conference. Then, at step 620, the process exits at a typical process exit point.

Figure 7A:
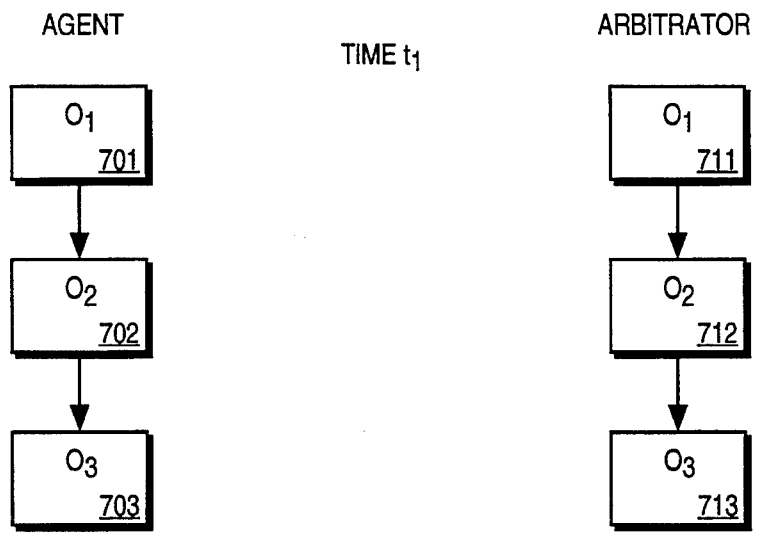
FIGS. 7a–7e illustrate object structures maintained by an arbitrator and an agent in a conferencing system during various time periods when an agent is performing actions in his local system.
Figure 7B:
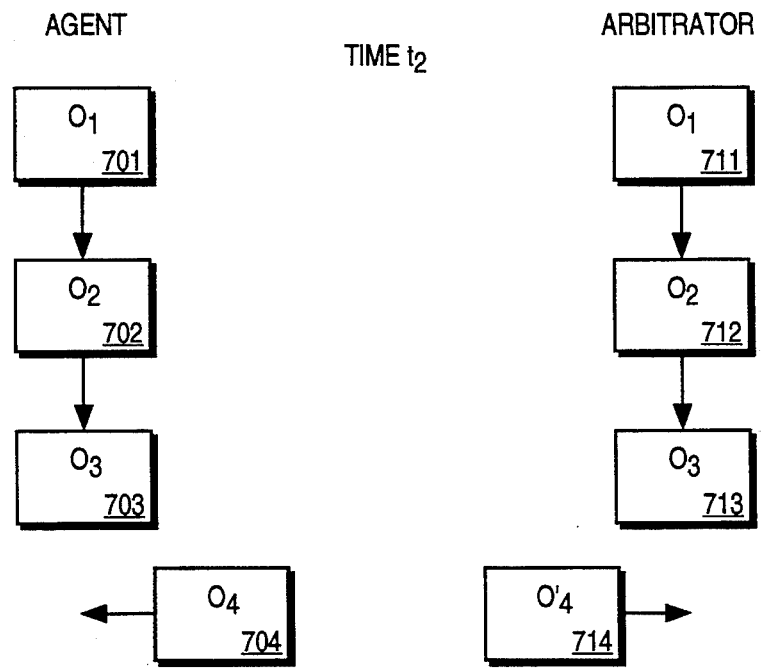
Figure 7C:
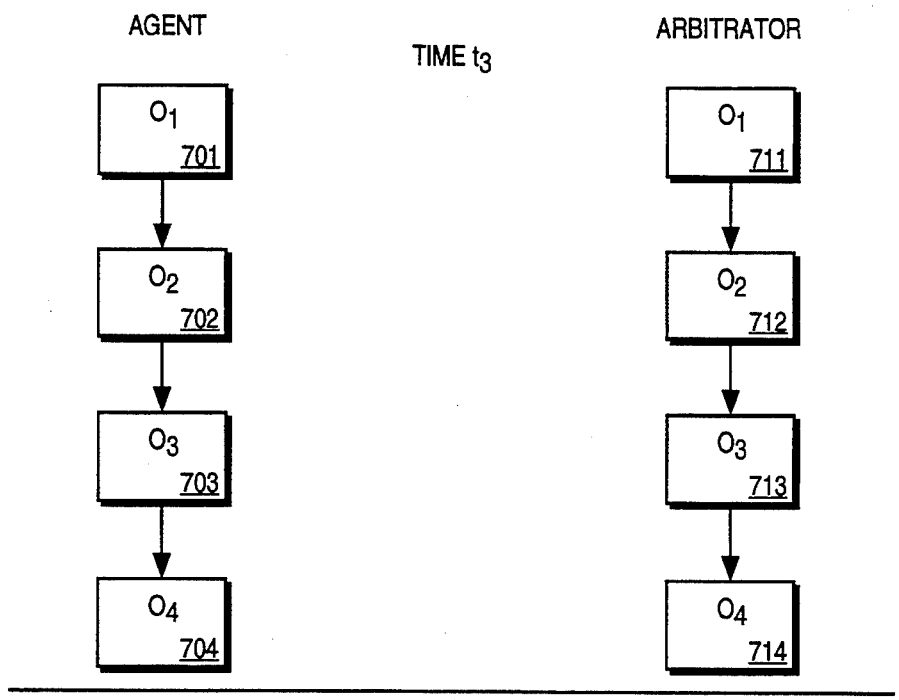
Figure 7D:
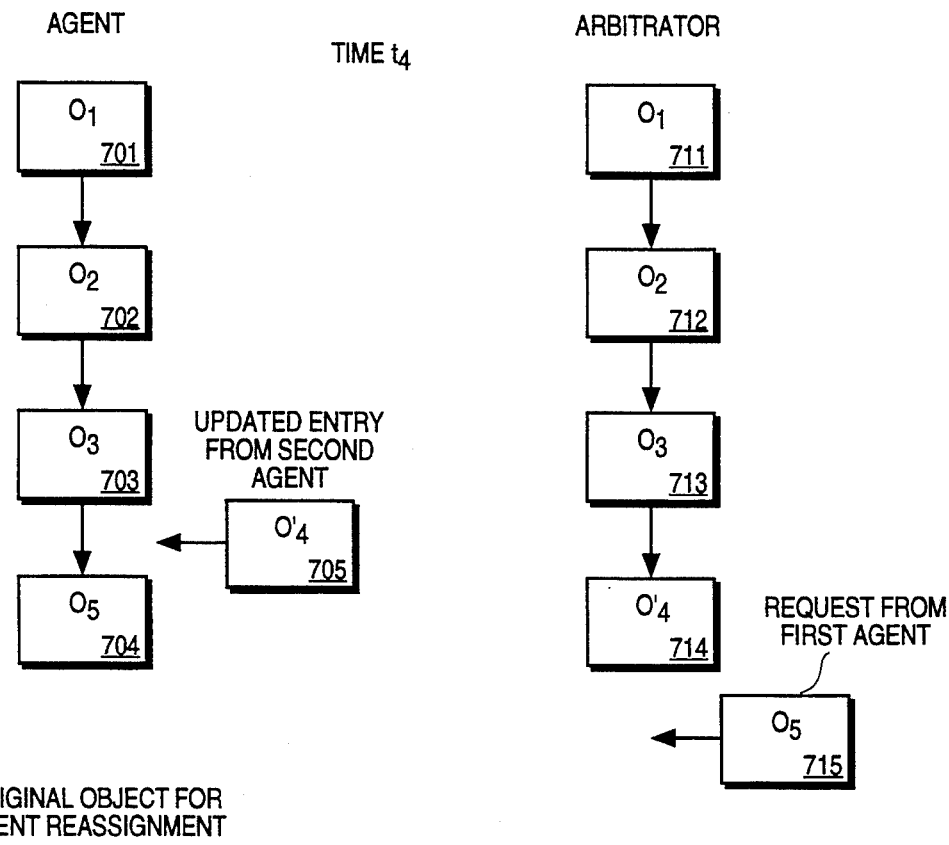
Figure 7E:
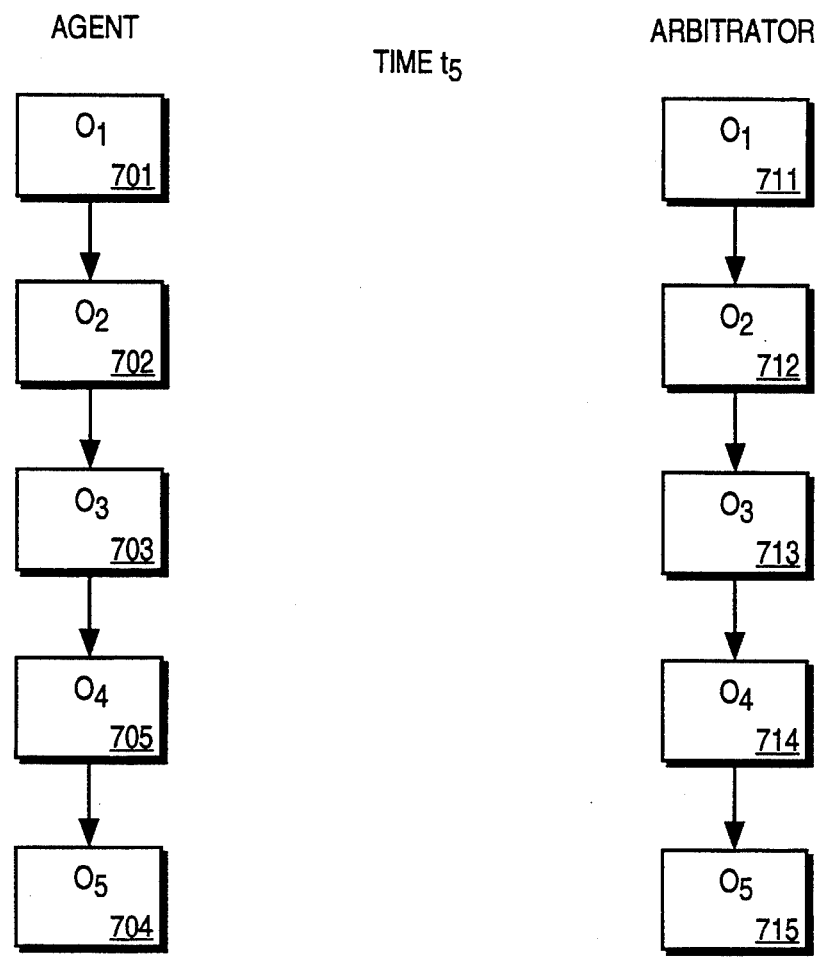

A simple illustration of a local and an arbitrator's meeting structures may be illustrate with reference to FIGS. 7a–7e, showing the addition of an object during certain steps in the process 600 illustrated in FIGS. 6a–6b. For example, at a time period $t_1$ as illustrated in FIG. 7a, a single agent or participant may have three items in its meeting structure 701–703, linked in a hierarchical fashion, e.g., a list of annotations or a list of pages. Similarly, an arbitrator agent may also have a similar three objects in its meeting structure, 711–713, wherein all the objects are not blocked in either agent. At a second time period $t_2$, as illustrated in FIG. 7b, the participant may create an additional object (e.g., 704), such as a page or an annotation to add to its local meeting structure. Simultaneously, the arbitrator may receive a request from a second participant to add an object to its meeting structure $O'_4$ 714 due to a request to add command. Then, subsequently, at time $t_3$, the arbitrator and the agent will each have within its local meeting structure, a different object having the same object index 4. For example, the agent may have the object 704 as its fourth object in its object meeting structure and the arbitrator may have object 714 as its fourth object in its meeting structure. Then, at a subsequent time period $t_4$, the agent will send a request to the arbitrator requesting the adding of an additional object to the "official" object structure maintained by the arbitrator. This is illustrated as 715 in FIG. 7d. Because all requests are serialized at the arbitrator from each of the participants in the conference, the request from the first agent to add the object 715 has arrived later in time than that request for the object 714. Thus, it is assigned an object index 5. The arbitrator will then transmit back to the requesting agent the index 5 to be associated with the object. The arbitrator then transmits back a response indicating that the object 704 should instead be assigned the object index 5. Another participant then transmits back a new object to be inserted into the local participant's object list O'₄ 705. Thus, at a subsequent time interval $t_5$ illustrated in FIG. 7e, both the arbitrator's and the original agent's meeting structures may be fully synchronized with one another and other participants in the conference. That is, all objects in the agent's meeting structure and the arbitrator's meeting structure are the same and in the same order.

Therefore, deferred synchronization of objects for participants in an electronic conference poses substantial advantages over the client/server model of the prior art; because, timing requirements between the client and server are more relaxed. Because full consistency between participants is deferred, local participants may perform such CPU-intensive operations as the modification and creation of annotations in real-time without the latency in coordinating such operations with the server. A further advantage which deferred synchronization of objects has over the client/server model of the prior art is that the synchronization of objects for all participants is provided without using a central data repository as common in the client/server model. This is substantial advantage because the computer conferencing system can be used between personal computers where a network client/server model is not available or practical. The local participant will perform all such changes to its local display and meeting structure, and updates will only be coordinated upon the receipt of a response from the arbitrator assigning an object index. Therefore, the present invention poses substantial advantages over the prior art systems which require full synchronization at all times between all participants in the conference thus incurring substantial latency for synchronization and response delays in the user's interface to the system.

Transfer of Large Object Data

One of the types of object data which may be transferred between participants in an electronic conference is known as a very Binary Large OBject or "BLOB." A BLOB is an object which would not normally be able to be transmitted during one complete idle cycle of the participant and transport medium. Thus, such objects need to be broken into smaller portions, or packets and transmitted over several idle cycles by a background task. BLOB's typically comprise items such as very large graphic data, OLE annotations or files to be transferred. In other embodiments of the present invention, such BLOB's may include full-motion video objects such as MPEG or JPEG files and/or audio data. Using the methods and apparatus described, the BLOB data is transmitted in packets, the size of each of the packets being dynamically based upon the capabilities of the transport medium, which may dynamically change as the connection between participants change. Therefore, if the speed of the connection between two participants' transport medium changes, the size of packets transmitted by the transmitter is changed. This is done dynamically during transmission time, in order to allow the most efficient use of the transport medium during the transmission of BLOB's. In addition, BLOB transmit requests are queued so that higher-priority BLOB's may be transmitted before lower-priority BLOB's. In this way, a participant who is viewing a first page containing BLOB data who switches pages to a second page also containing BLOB data, the second page, which becomes the current viewing page containing the BLOB(s), becomes reprioritized within the transmitter to be transmitted ahead of the BLOB for the first page. This is done using a reprioritization request from the requester. Then, the out-going transfer queue is rearranged by the transmitter to effect the desired change of transfer priority. The details of these mechanisms will now be discussed.

First, during a typical electronic conference, BLOB data may not necessarily be transmitted to other participants upon creation of a BLOB within a local participant. In other words, transmission of the data for a BLOB may be deferred until a later time at which the transport medium may be idle, or the local participant has some idle processing time. Therefore, during creation of a BLOB, remote participants may be notified that the BLOB data is not contained within the BLOB to be created, and the remote participant(s) only create the object in their local meeting structures for the BLOB absent any data. During later idle periods of either the local participant and/or the remote participants, the BLOB data itself to be contained within the BLOB object in the meeting structure of the remote participants, may be added at such time as is convenient for the two participants. A typical chronology of actions which may be performed during a BLOB creation and transmission is illustrated with reference to FIG. 8.

Figure 8:
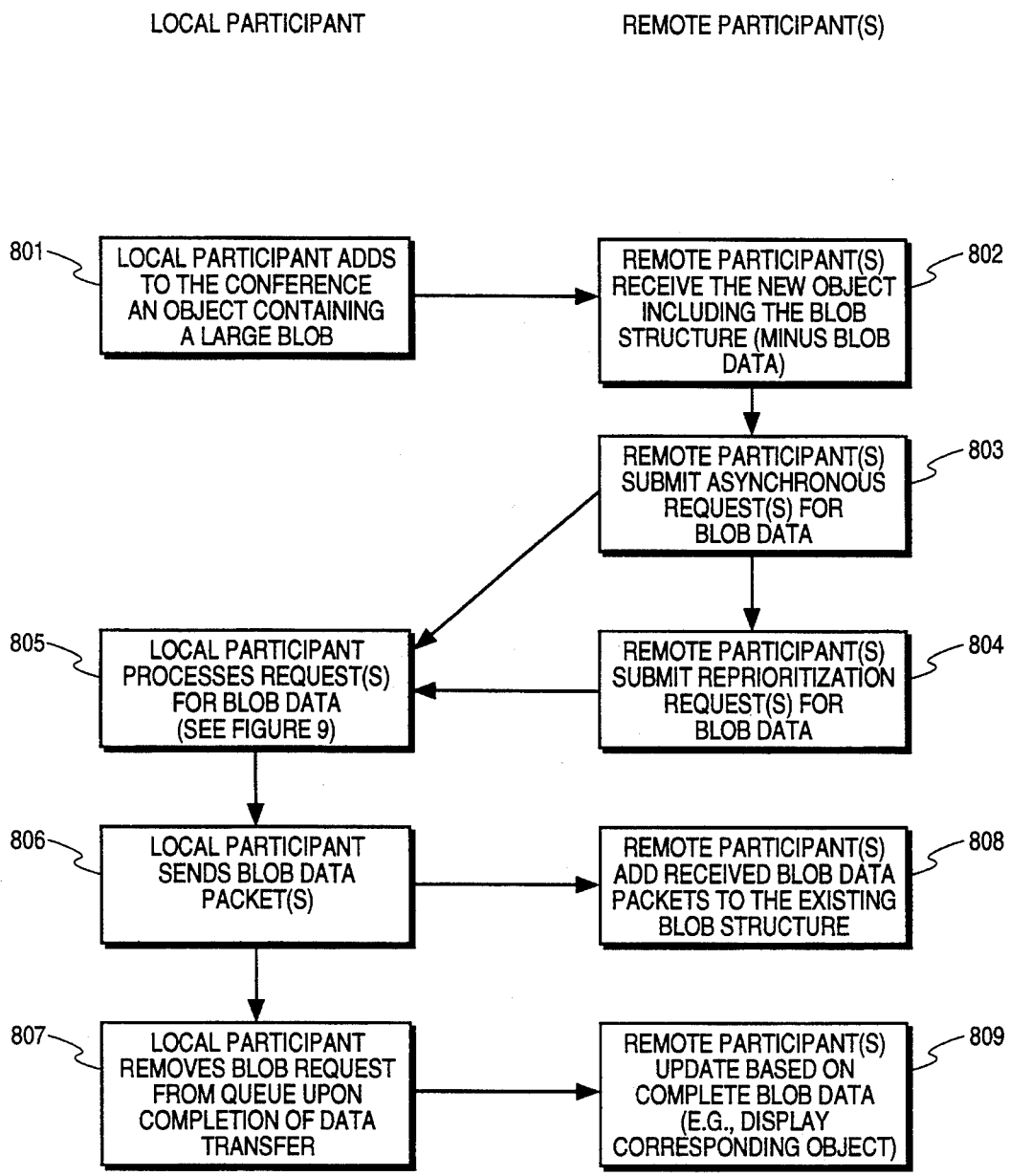
FIG. 8 illustrates a method used for the deferred transfer of very large binary object data within certain embodiments of the present invention.

The steps illustrated with reference to FIG. 8 illustrate the sequence of steps taken by local and a remote participant(s) engaged in a conference. For example, at a first step such as 801 in FIG. 8, a local participant may add to its local meeting structure an object containing a BLOB. The object manager 230 contained within the local participant will then notify all the remote participants that they should also create objects within their local meeting structures an object for a BLOB, at step 802. This, of course, is performed after all necessary synchronization, as was described with reference to the deferred synchronization process above, including determination of the object index and other relevant information for an object. Then, each of the remote participants individually submits asynchronous requests at step 803 to the local participant for the BLOB data. The local participant then, at step 805, processes the request for BLOB data such as placing the request in a BLOB request queue and later providing the data during idle times. Also, subsequent to the asynchronous requests by various participants for the BLOB data at step 803, the remote participants may further submit reprioritizations of prior requests for BLOB data at step 804. In other words, if a remote participant had first requested BLOB 1 and then later subsequently requested BLOB 2, the two requests may be reprioritized so that BLOB 2 may take priority over BLOB 1 for the remote participant. In this manner, if the remote participant switches from a first page containing BLOB 1 to a second page containing BLOB 2, the local participant will then re-order the BLOB requests for that particular participant.

As already discussed, the local participant processes requests for the BLOB data at step 805. This will be discussed in more detail with reference to FIG. 9 below. The local participant then sends to each of the remote participants the requested BLOB data packets at step 806. As will be discussed in more detail below, BLOB data packets are sent according to the transport medium between the two participants. Therefore, if the remote participant is connected to a high-capacity, high-speed transport medium such as a Ethernet, then the size of the data packets will be substantially larger than if the participant was connected via modem over a telephone line. As the local participant sends the BLOB data packets at step 806, each of the remote participants receives the BLOB data and adds the BLOB data packets to the existing BLOB data structure. Then, the local participant after completion of the transmission of all the BLOB data packets for the requested BLOB, removes the BLOB from the request queue upon completion of the data transfer at step 807. The human interface process of the remote participant is notified to update the display of the previously incomplete BLOB-containing object. More detailed illustrations of certain of the process steps will now be discussed.

Figure 9:
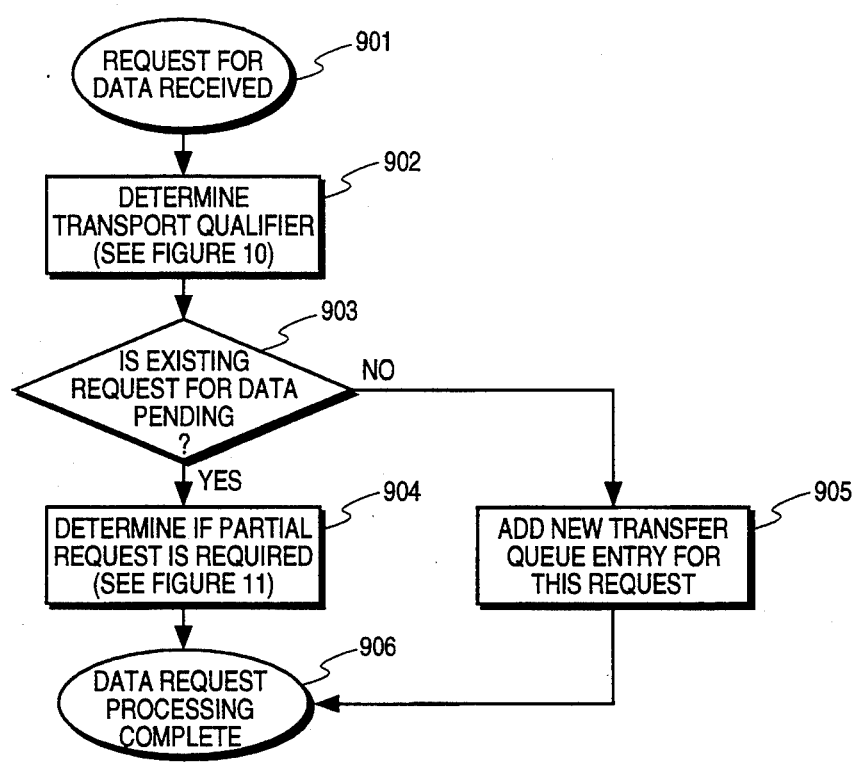
FIG. 9 illustrates an object data request process flow diagram used in one embodiment of the present invention.

Process 900 of FIG. 9 illustrates a series of steps which are taken by a local participant upon receipt of a request for BLOB data, the request being transmitted by remote participants. For example, at step 901, a process entry point such as that from an event loop of a main process is entered. That is, multiple new and reprioritization requests may be received from multiple participants asynchronously. Then, at step 902, the transport qualifier for the new request or for a reprioritization request is determined. That is, it is determined whether the transport medium for the remote participant is either a high or low-speed transport medium. Determination of the medium capability (i.e., high or low-speed) is used as a qualification when considering the combination of requests from multiple participants. As will be discussed in more detail below, during transfer of a BLOB, for each BLOB in the transfer queue, a SIZE and an OFFSET is maintained for each transfer queue entry of BLOB data so that the last datum in the BLOB which was transferred may be referenced. Multiple requests can be combined into one queue entry, and likewise, multiple reprioritization requests simply reprioritize queue entries. Therefore, upon an initial request for BLOB data, the offset will be zero, that is, the beginning of the BLOB, and the size will be set equal to the full length of the BLOB. At any rate, more detailed steps for determining the transport qualifier will be illustrated with reference to process 1000 of FIG. 10. An example of the reprioritization process is described in connection with FIG. 17.

Once the transport qualifier has been determined, it is determined at step 903 whether an existing request for data pending indicates receipt of a reprioritization request of an original request for BLOB data. If it is a request for pending data, then it is determined at step 904 whether a partial request is required. That is, if other remote participants request the same BLOB data which has already been requested and which has already started to be transferred, the new requesting participants may receive the BLOB data from the intermediate point at which the request was made, but they will also require any data which had been transferred up until that point. Thus, redundant transfers of data are eliminated by combining nearly simultaneous requests from multiple remote participants. For cases where transfer associated with an original request has not yet started, the subsequent requesting participants are merely added to the distribution list of the original transfer queue entry. Otherwise, if transfer has commenced, in addition to the above, one additional transfer queue entry will be added to account for the data already transferred. If, however, no pending requests exist for the actual BLOB data, then a new transfer queue entry in entered into the participant's transfer queue at step 905, in order to keep track of the BLOB transfer. As previously discussed, the queue entry maintains an OFFSET and SIZE in order to track the transfer for individual requests. At any rate, upon completion of either steps 904 or 905, the data request processing is complete at step 906, after which an actual data BLOB transfer will occur in the background (i.e., during idle processing time), and the process 900 will return to the normal event loop of the executive routine of the local participant.

Figure 10:
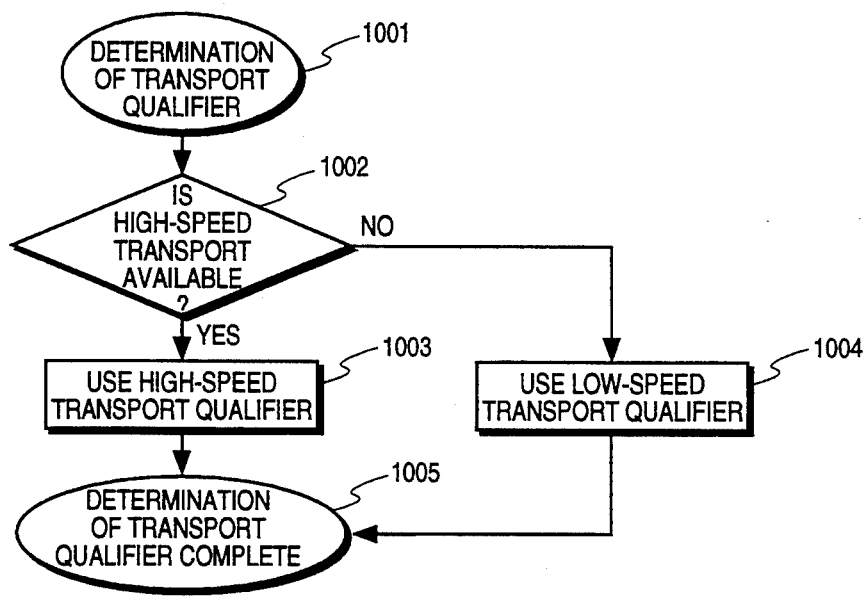
FIG. 10 illustrates the determination of a transport qualifier used for transferring large object data in one embodiment of the present invention.

A more detailed illustration of the process steps taken at step 902 of FIG. 9 is illustrated with reference to FIG. 10. Process 1000 is used for determining the transport qualifier. The transport qualifier is used in handling the combination of multiple requests. That is, requests from recipients connected via a high-speed medium are not combined with requests from recipients connected via low-speed media, and vice versa.). This is done dynamically, upon each request for transfer of a BLOB packet during idle processing time. Thus, the transport qualifier for a particular participant is used to allow the higher or lower-capacity transport medium to be accommodated. Note that the transport qualifier may specify any number of levels of transport throughput. The present invention is not limited to a high and low level only. For example, the transport levels can be specified to partition 4800 band modems, 9600 band modems, ISDN connections, fast and slow network connections, etc.

At any rate, process 1000 starts at a typical process entry point 1001. Then, at step 1002 it is determined whether a high-speed transport facility is available between the local and requesting participant. If so, then the high-speed transport qualifier is used at step 1003. If, however, the remote and local participants are coupled via a low-speed transport medium as detected at step 1002, then at step 1004, a low-speed transport qualifier is used. At any rate, at step 1005, determination of the transport qualifier is complete and the accompanying process may continue.

Figure 11:
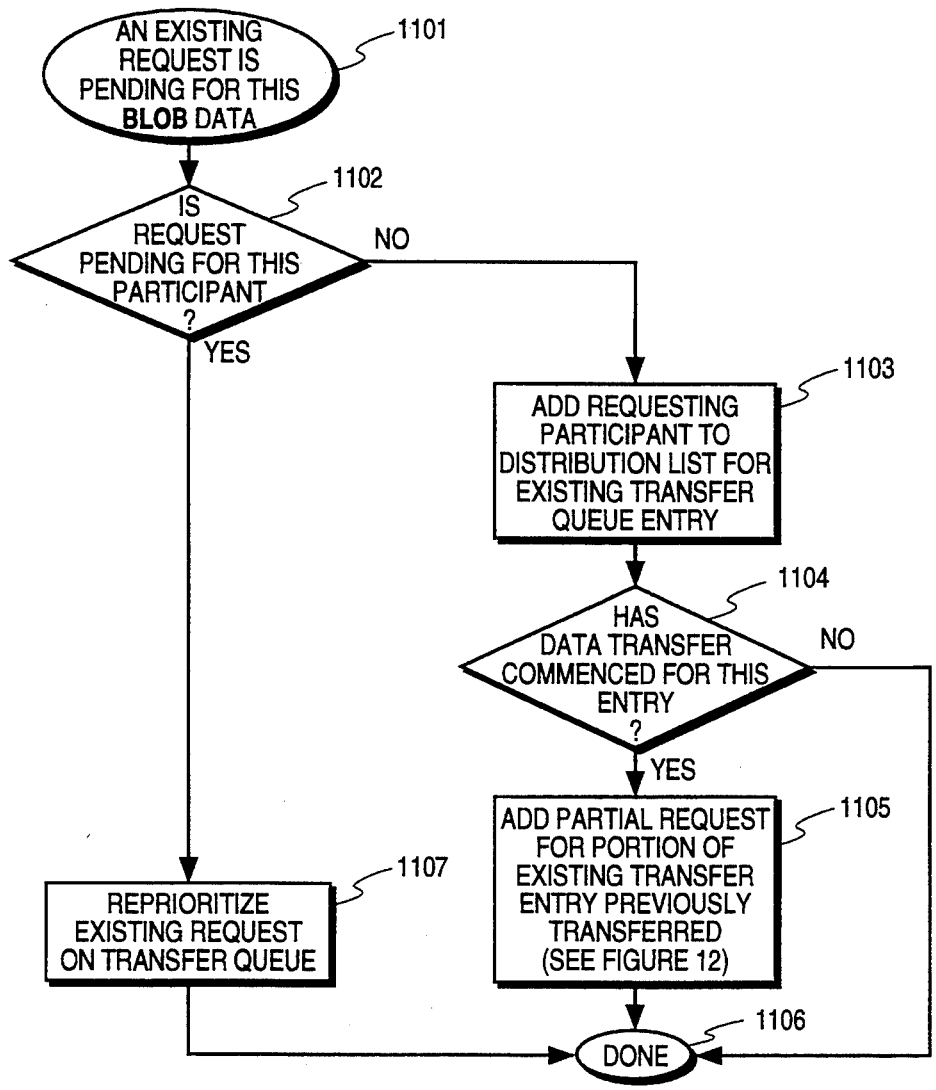
FIG. 11 illustrates a process flow diagram of a process used for determining the need for a partial request of large object data in one embodiment of the present invention.

The deferred transfer of object data process which was discussed with reference to step 904 of FIG. 9, is now discussed with reference to process 1100 of FIG. 11. For example, it has already been determined that an existing request is pending for the specific BLOB data at step 1101, a typical process entry point from an event loop of an executive process. If a request is already pending for the current participant at step 1102, then it is considered a reprioritization request for the given participant and the existing BLOB request on the transfer queue is reprioritized at step 1107 illustrated in FIG. 11. Thus, any other BLOB requests for that particular participant are reprioritized. Then, at step 1106, the process is complete and process 1100 is returned from at a typical process exit point.

If, however, a request was not pending for this particular participant, as detected by referencing the participant index for the requesting participant which is associated with the element in the transfer queue, then, at step 1103, the requesting participant is added to the distribution list for the existing transfer queue entry. Therefore, the participant index may be added to the existing transfer queue entry. A corresponding partial request entry may exist for each participant in the distribution list, but it is not required. Requests from multiple participants may have been received prior to commencing associated data transfer and as such only the single transfer queue entry exists. Once data transfer commences, additional requests from new participants will cause a combining with the existing entry and the addition of a partial entry for the data transfer completed at that time. Therefore, if data transfer has already commenced for the particular BLOB as specified in its transfer queue entry at step 1104, then a partial request for the remaining portion of the BLOB must be added into the transfer queue entry. This is performed at step 1105. That is, all the data associated with the BLOB and previously transferred to the other remote participants must be transferred to the current requesting participant upon completion of the current transfer. This is so that this participant may also bring its BLOB current with the other participants' in the conference. If, however, data transfer has not been commenced for this entry, the requesting participant has merely been added to the existing transfer queue entry at step 1103 and step 1104 proceeds to step 1106, the process exit point. The partial request for the portion of an existing transfer entry previously transferred at step 1105 will be illustrated in more detail with reference to FIG. 12. Thus, an additional partial request is added to the transfer queue at step 1105. This will now be discussed with reference to FIG. 12.

Figure 12A:
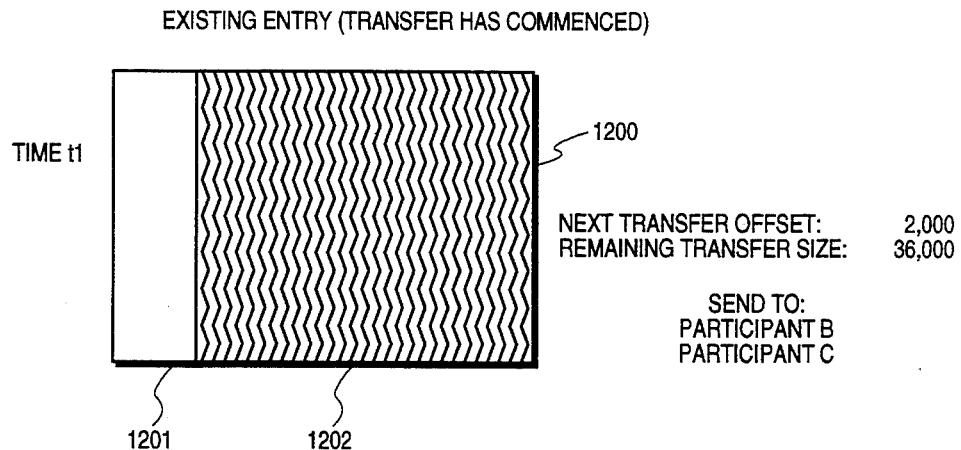
FIGS. 12a–12c illustrate various stages of completion of the transfer of very large object data in one embodiment of the present invention.
Figure 12B:
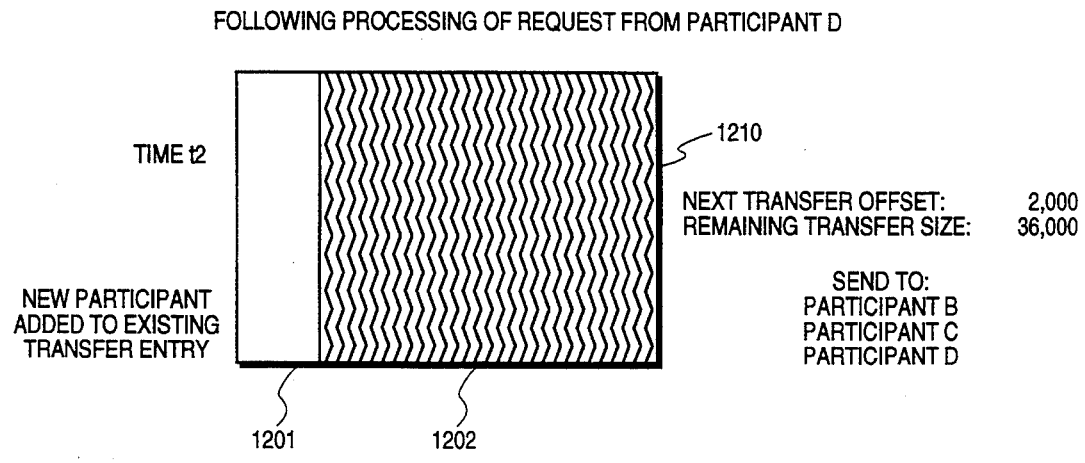
Figure 12C:
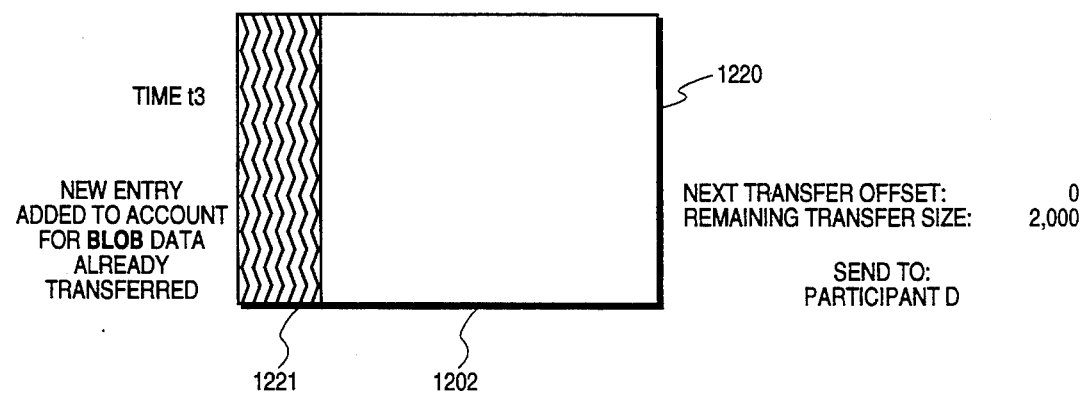

The preparation of partial requests will be illustrated with reference to FIGS. 12a–12c. For example, a BLOB of 38,000 bytes may be requested by two participants B and C to be transferred from a local participant. In this case, initially, the offset will be set to zero for the two participants and in a remaining transfer will be equal to 38,000. Then, at some intermediate time period later, e.g., time $t_1$ (time after data transfer has commenced) illustrated in FIG. 12a, the transfer offset will be equal to 2000, and the remaining transfer size will be equal to 36,000 indicating that 2000 bytes have been transferred to date. This is illustrated with reference to portion 1201 and portion 1202 of the graphic representation of the BLOB 1200. At this time period, then a third participant, participant D, may request transfer of the same BLOB data from the local participant. In this case, participant D is added to the distribution list (of the existing BLOB queue entry with OFFSET 2000 and SIZE 36000) and a subsequent partial (request) transfer queue item will be added to the transfer queue at a position after the current transfer queue entry (for OFFSET 0 and SIZE 2000). Thus, at a subsequent time period $t_2$ illustrated in FIG. 12b, participant D will be added to the existing transfer entry distribution list and transfer may continue from the transfer offset 2,00 and the remaining transfer size 36,000 indicated in the BLOB transfer queue entry. This is graphically represented with reference to 1210 which illustrates the to-date portion transfer 12 11 and the remaining portion 1212. Finally, upon completion of the transfer of the item represented in FIG. 12b, another queue entry will be referenced for transferring only a portion of the BLOB since participant D's request was received in the middle of the initial transfer to participants B and C. In this instance, the next transfer entry at time $t_3$ illustrated in FIG. 12c, will have a transfer offset of zero (indicating the beginning of the file) and a remaining transfer size of 2000 indicating that the first 2000 bytes of the BLOB are requested to be transferred to participant D. This is illustrated graphically with reference to 1220 illustrating the complete BLOB and only the portion 1221 which is requested by this queue entry to be transferred to participant D. Once this partial transfer has been completed, then all of participants B, C and D have received the complete BLOB and redundant transfers of the portion of the data represented by 1202 and 1212 and FIGS. 12a and 12b have been avoided. Thus, participant D only receives the portion which was transferred up until the time in which its own request was made, that is represented by area 1221 in FIG. 12c. The transfer of data for the partial portion illustrated in FIG. 12c is transferred from the end of the partial portion to the beginning, in order so that the BLOB may be maintained contiguously in the memory of the requesting participant. Then, upon completion of receipt of the partial portion illustrated in FIG. 12c, the participant D notifies its human interface to update the display of the annotation containing the previously incomplete BLOB object. Thus, upon completion of the transfer indicated by the transfer entry shown in FIG. 12c, the transfer of the BLOB to all of participants B, C and D is complete. Transfer to participant B and C is complete after completion of the transfer associated with the original queue entry. Transfer to participant D completes at a later time when the queue entry associated with the partial request is complete.

During transfers of such BLOB data, the remote participant and the local participant may be informed of such operations using a progress bar or other user interface feature under control of the Human Interface (HI) layer 210 of the agent during participant idle time. Thus, the user may be informed of intermediate transfers of data for proper system feedback.

Note that the BLOB data transfer mechanism uses a Clear-To-Send or CTS protocol wherein if transfer of data associated with a particular transfer queue entry cannot continue because a recipient is not Clear-To-Send, subsequent transfer queue entries not containing a not Clear-To-Send recipient are considered for transfer. This is performed in order to maximize full potential of the transport medium, during idle times of individual participants. The Clear-to-Send protocol of the present invention is described in more detail in connection with FIG. 18.

Referring now to FIG. 13, an architectural diagram illustrates the components of the Background Transfer Manager (BTM) of the present invention. The transfer of large object data is controlled by the BTM. The BTM consists of six major portions: 1) participant connection/disconnection control logic 1312, 2) request processing logic 1314, 3) data transfer processing logic 1316, 4) a Clear-To-Send list 1318, 5) an out-going transfer list 1320, and 6) an in-coming transfer list 1322. The logic component 1312 is described in connection with FIGS. 14 and 15. The logic components 1314 and 1316 are described in connection with FIGS. 16–20. The Clear-To-Send list 1318 is used to maintain the Clear-To-Send status of requests. This protocol is described in connection with FIG. 18. The in-coming transfer list 1322 is used to record those entries for which BLOB data requests have been submitted to remote users. The BTM uses this list when processing subsequent requests to determine whether to send a new request or a reprioritization request. The out-going transfer list 1320 is used to maintain priorities of out-going BLOB data transfers.

Figure 14:
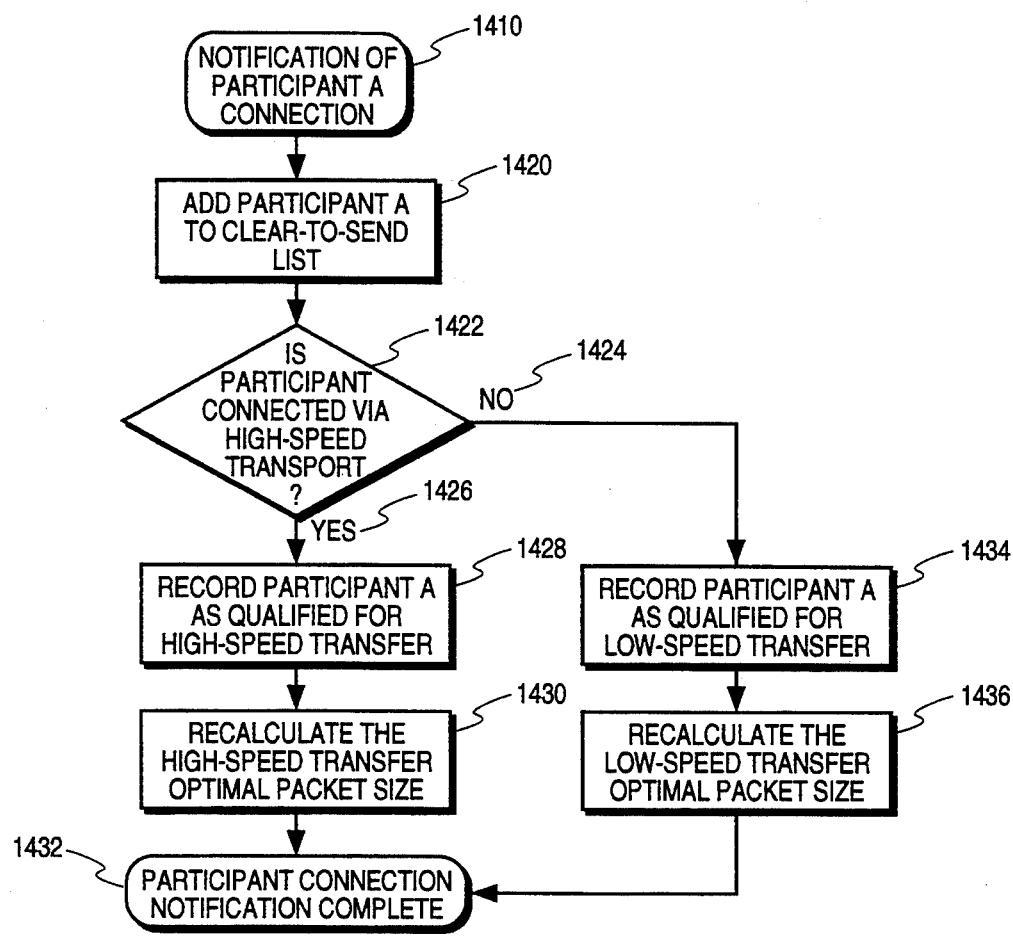
FIGS. 14–15 illustrate the processing logic for the Participant Connection/Disconnection Logic.
Figure 15:
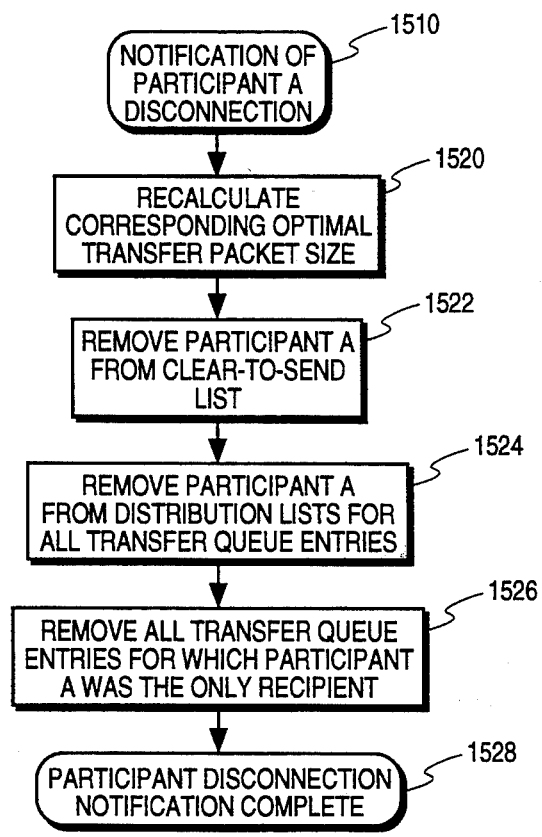

Participant connection/disconnection processing logic 1312 pertains to reinitialization upon notification of participant connection and flushing of participant-specific information upon participant disconnect notification. Referring now to FIGS. 14 and 15, flowcharts illustrate this connection and disconnection processing.

Referring to FIG. 14, a notification of a participant connection is received at block 1410. The newly connected participant is added to the Clear-To-Send list 1318 at block 1420. Depending on the transport medium characteristics, the participant is qualified for high speed transfer with a corresponding optimal packet size (blocks 1428 and 1430) or qualified for low speed transfer with a corresponding optimal packet size (blocks 1434 and 1436).

Referring to FIG. 15, a notification of a participant disconnection is received at block 1510. The optimal packet size is recalculated in block 1520. The participant is removed from the Clear-To-Send list in block 1522. The participant is removed from all distribution lists for all transfer queue entries in block 1524. Transfer queue entries for which the participant was the only recipient are removed in block 1526.

At the time of participant connection/disconnection, optimal transfer sizes are determined for each level of transport throughput (high and low-speed) in use. These sizes remain constant between participant connection and disconnection events. Or put another way, only participant connection and disconnection events affect the optimal transfer size. Note that the optimal transfer size is not a maximum transferable packet size. It's the most optimal size that can be handled to prevent partitioning of the packet. Utilizing this packet size, or smaller, the packet takes the fastest path through the processing logic on both the send and receive ends.

Referring again to FIG. 13, Request Processing logic 1314 is used on both sending and receiving systems. The Request Processing logic 1314 and Data Transfer logic 1316 both use a transfer queue for tracking the status of BLOB requests and BLOB data. Referring to FIG. 16, an architectural diagram illustrates the structure of a single Background Transfer Manager Transfer Queue entry 1610. The transfer queue entry 1610 comprises a reference to a single BLOB object 1612 that represents the BLOB object being tracked by the transfer queue entry. A next transfer offset 1614 and a remaining transfer size 1616 is used to track the progress of the transfer of BLOB data. Recipient list 1618 is a list of participants that should receive the particular BLOB identified by reference 1612. Previous transfer queue entry 1620 and next transfer queue entry 1622 are used to link BLOB requests together in the transfer queue.

Figure 19:
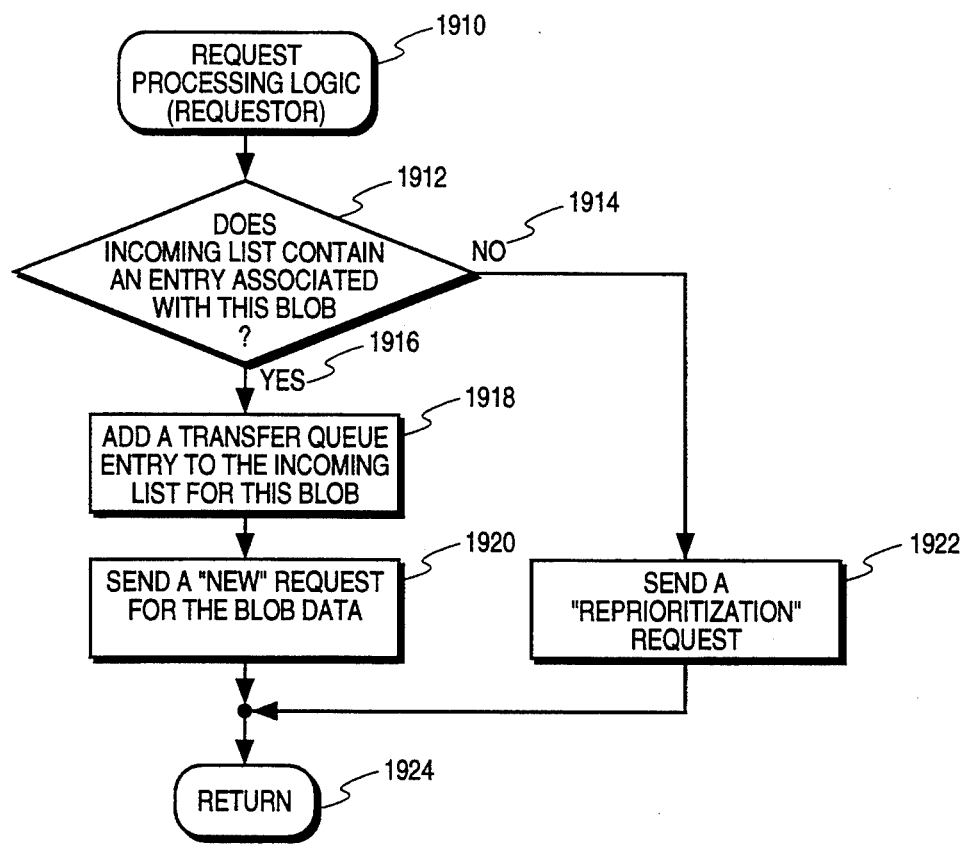
FIGS. 19–20 illustrate the Request Processing Logic of the present invention.
Figure 20:
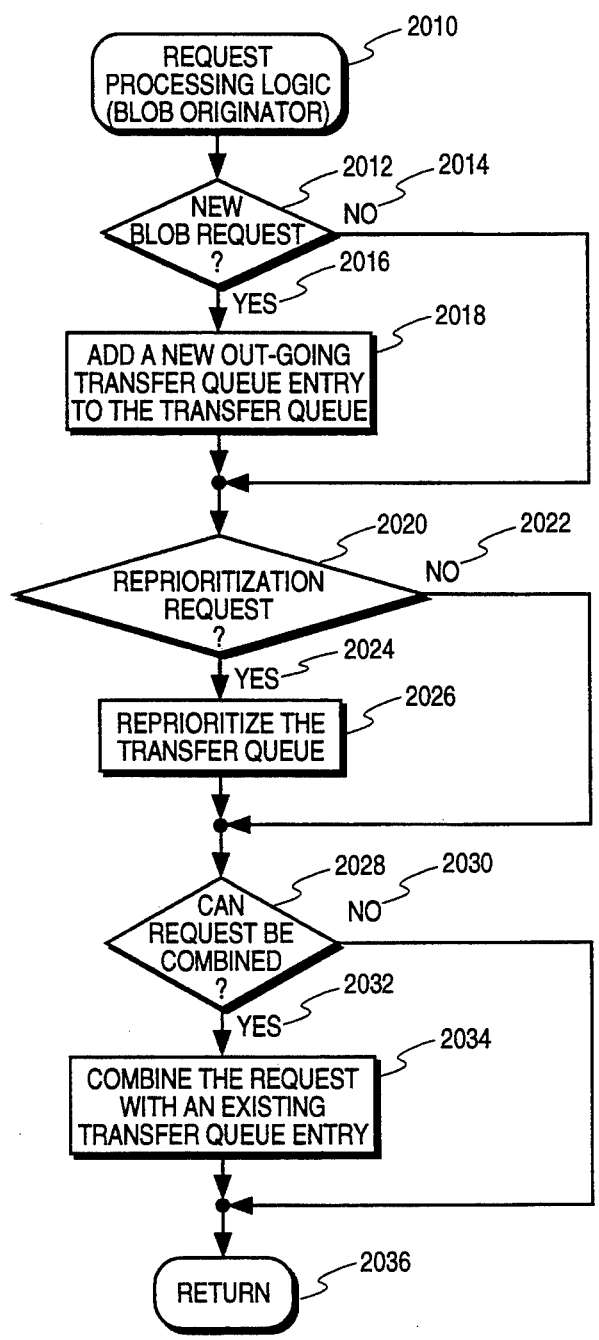

Referring to FIG. 19, the Request Processing logic 1910 for a requesting participant is illustrated. FIG. 20 illustrates the Request Processing logic 2010 for a BLOB originator. A BLOB originator of BLOB data sends a BLOB object structure without its corresponding data to other participants. These other participants are referred to as "requestors" relative to this BLOB data. As shown in FIG. 19, a requestor of BLOB data first checks the in-coming transfer list 1322 to determine if a particular BLOB is already in the list 1322 (decision block 1912). If so, a reprioritization request is sent to the BLOB originator thereby increasing the priority of the existing request for BLOB data (processing block 1922). If the BLOB is not already in the in-coming transfer list 1322, the BLOB requestor adds a transfer queue entry to the in-coming transfer list 1322 (processing block 1918) and sends a new request for BLOB data to the BLOB originator (processing block 1920). Request Processing logic for a BLOB requestor then terminates through return bubble 1924.

As shown in FIG. 20, the BLOB originator then processes this request and either adds a new out-going transfer queue entry (processing block 2018), reprioritizes an existing transfer queue entry (processing block 2026), or combines the request with an existing entry (processing block 2034) to track the transfer of the BLOB data. No BLOB data transfer occurs as a result of this processing.

Figure 17:
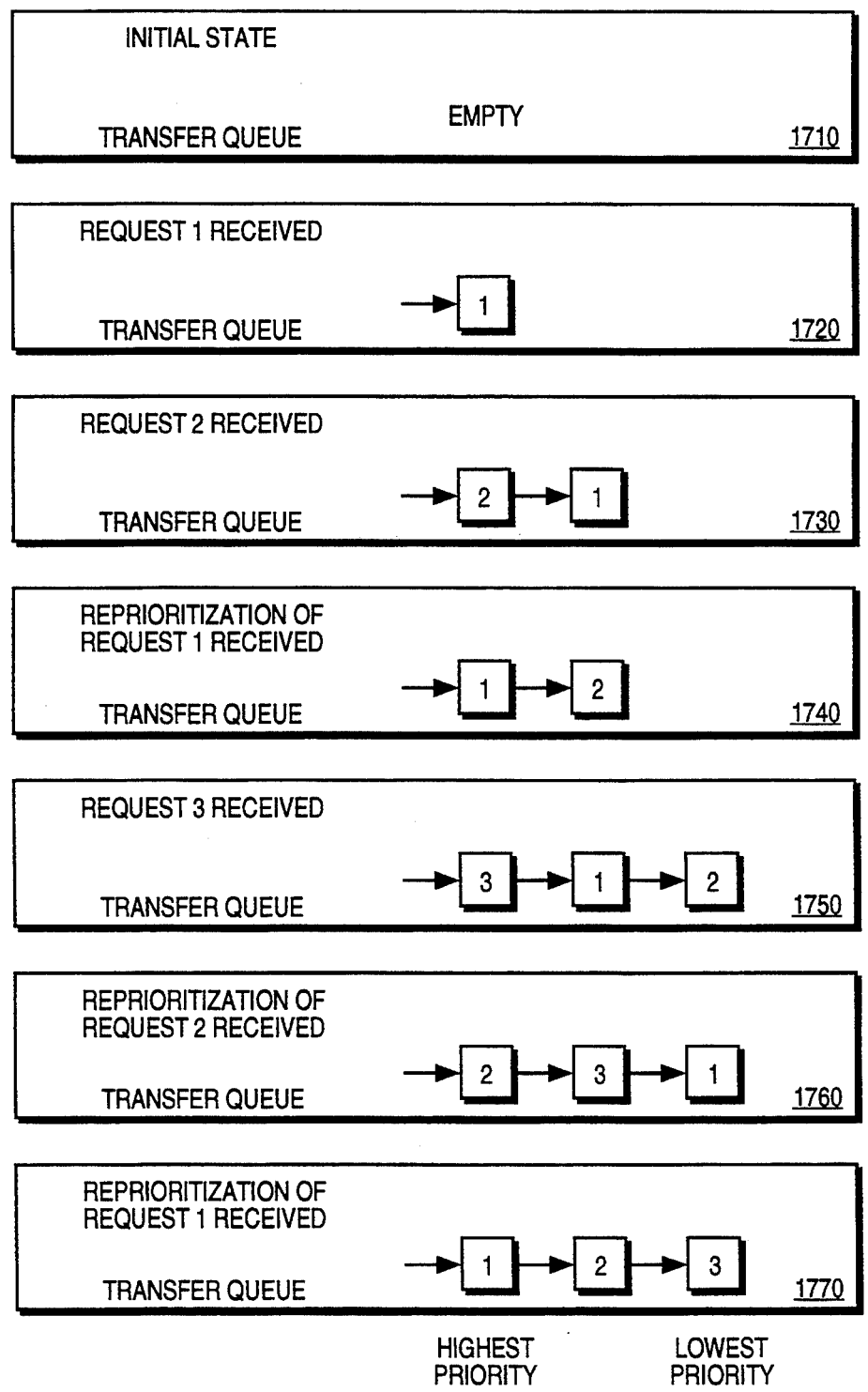
FIG. 17 illustrates an example of the transfer request reprioritization process.

FIG. 17 illustrates an example of transfer queue reprioritization. As shown, BLOB requests are added to the transfer queue in the order received (step 1720 and 1730) until a reprioritization request is received (step 1740). At step 1740, request 1 is moved ahead of request 2. Subsequent requests are added to the transfer queue (step 1750) until another reprioritization request is received (step 1760). In this case, request 3 is moved ahead of both request 1 and 2. If another reprioritization request is received, the subject request (request 1 in step 1770) is moved ahead of the other requests in the transfer queue.

Referring again to FIG. 13, Data Transfer processing logic 1316 is used during processing idle time. At this time, the BTM examines the current out-going transfer queue for entries requiring data transfer. For these entries, the BTM repeatedly checks if the transport is Clear-To-Send a packet of optimal size (as previously determined) to the list of recipients listed in the transfer queue entry, and sends the packet if Clear-To-Send. The Clear-To-Send list 1318 is used to track the Clear-To-Send status of packets of BLOB data. If not Clear-To-Send, the recipients are marked as not Clear-To-Send, and the BTM proceeds to the next transfer queue entry whose recipient list does not contain a not Clear-To-Send recipient and repeats the packet sending process. This process continues until either all BTM entries have been processed or all participants are marked as not Clear-To-Send. At this point, all participants' not Clear-To-Send status is cleared to prepare for the next idle time processing.

Figure 18:
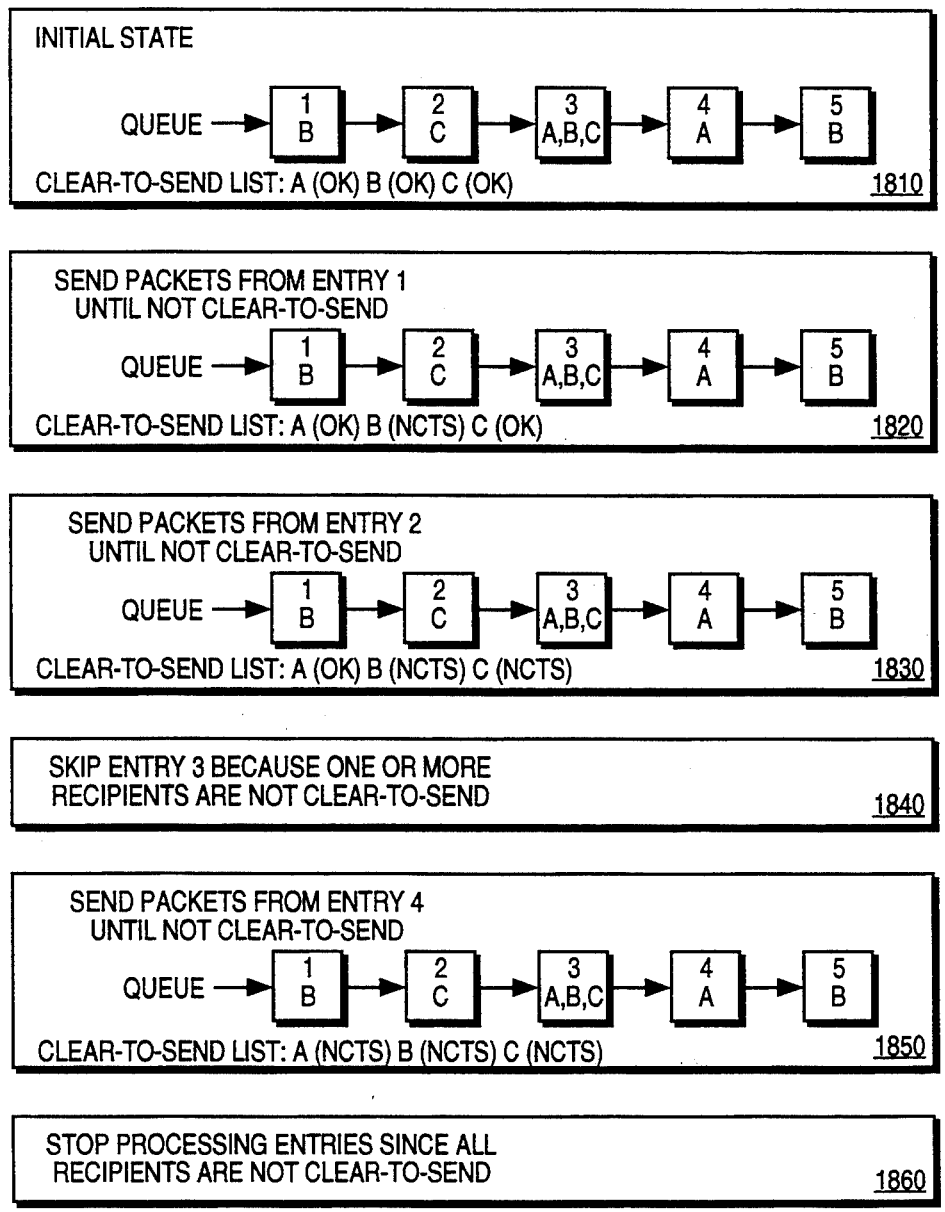
FIG. 18 illustrates an example of the Clear-to-Send processing of a transfer queue entry.

FIG. 18 illustrates an example of the Clear-To-Send processing of the present invention. In this example, each cell or box represents a transfer queue entry. The numeral in each cell represents an entry number used solely for identification purposes. The letter(s) in each cell represent(s) the recipient(s) corresponding to the transfer queue entry. In the initial state in this example (step 1810), each transfer queue entry (cell) is initialized and each recipient is initially Clear-To-Send (A-OK, B-OK, and C-OK). In step 1820, packets from entry 1 are sent until recipient B is no longer Clear-To-Send (i.e., Not Clear-To-Send-NCTS). In this case, the Data transfer processing logic 1316 shifts the data transfer operation to entry 2 (step 1830). In step 1830, packets from entry 2 are sent until recipient C is no longer Clear-To-Send. In step 1840, entry 3 is skipped, because participant B, which is a recipient of entry 3, is Not Clear-To-Send. In step 1850, packets from entry 4 are sent until recipient A is no longer Clear-To-Send. Because all entries in the transfer queue are not Clear-To-Send in step 1860, data transfer processing ends and processing returns to the main loop. This process is repeated during each idle time.

Thus, in conclusion, an improved method for the transmission of very large object data and the deferred synchronization of participants during an electronic conference has been described. Although the present invention has been described with reference to specific embodiments, it can be appreciated by one skilled in the art that may departures and modifications may be made and the present invention is only to be construed as limited by the appended claims which follow.

What is claimed is:

1. In an electronic conferencing system wherein data is shared between a plurality of participants during an electronic conference, a method of transferring shared teleconference object data among said participants during said electronic conference comprising the following steps:
   a. a first participant system receiving an asynchronous request for said shared teleconference object data from a second participant system;
   b. said first participant system placing said request for said shared teleconference object data in a request queue;
   c. said first participant system rearranging said request for said shared teleconference object data in said request queue with respect to other requests for other shared object data in said request queue if an asynchronous reprioritization request for reprioritization of said request for said shared teleconference object data in said request queue from said second participant system is received by said first participant system;
   d. said first participant system dynamically determining a transport medium capability for a transport medium between said first participant system and said second participant system and determining an optimal packet size for said transport medium capability;
   e. said first participant system processing said shared teleconference object data into packets, a size of each of said packets being said optimal packet size;
   f. said first participant system transferring each of said packets to said second participant system via said transport medium upon completion of processing said shared teleconference object data into each of said packets; and
   g. said first participant system removing said request for said shared teleconference object data from said request queue upon completion of said step of transferring said packets for said shared teleconference, object data.

2. The method as claimed in claim 1 wherein said large object is a binary large object (BLOB).

3. The method as claimed in claim 2 wherein said step of placing said request in a request queue further includes a step of maintaining a transfer queue including an entry for each request for the transfer of one or more BLOBs.

4. The method as claimed in claim 2 further including a step of transferring a BLOB from said first participant system to said second participant system only if a transfer status indicates clear to send.

5. The method as claimed in claim 3 further including a step of reprioritizing said transfer queue if a request for reprioritization is received from a participant.

6. In an electronic conferencing system wherein data is shared between a plurality of participants during an electronic conference, an apparatus for transferring shared teleconference object data among said participants during said electronic conference comprising:
   a. means for a first participant system receiving an asynchronous request for said shared teleconference object data from a second participant system;
   b. means for said first participant system placing said request for said shared teleconference object data in a request queue;
   c. means for said first participant system rearranging said request for said shared teleconference object data in said request queue with respect to other requests for other shared object data in said request queue if an asynchronous reprioritization request for reprioritization of said request for said shared teleconference object data in said request queue from said second participant system is received by said first participant system;
   d. means for said first participant system dynamically determining a transport medium capability for a transport medium between said first participant system and said second participant system and determining an optimal packet size for said transport medium capability;
   e. means for said first participant system processing said shared teleconference object data into packets, a size of each of said packets being said optimal packet size;
   f. means for said first participant system transferring each of said packets to said second participant system via said transport medium upon completion of processing said object data into each of said packets; and
   g. means for said first participant system removing said request for said object data from said request queue upon completion of said step of transferring said packets for said shared teleconference object data.

7. The apparatus as claimed in claim 6 wherein said shared teleconference object data is a binary object (BLOB).

8. The apparatus as claimed in claim 7 wherein said means for placing said request in a request queue further includes means for maintaining a transfer queue including an entry for each request for the transfer of one or more BLOBs.

9. The apparatus as claimed in claim 7 further including means for transferring a BLOB from said first participant system to said second participant system only if a transfer status indicates clear to send.

10. The apparatus as claimed in claim 8 further including means for reprioritizing said transfer queue if a request for reprioritization is received from a participant.

11. The method of claim 1 wherein said first participant system placing said request for said shared teleconference object data in said request queue includes creating a transfer queue entry in said transfer queue.

12. The method of claim 11 wherein said transfer queue entry includes a reference to an offset to said shared teleconference data awaiting processing and transferring and an amount of said shared teleconference data remaining to be transferred.

13. The method of claim 1 further comprising the step of said first participant system receiving a second asynchronous request for said shared teleconference object data from a third participant system, wherein said second asynchronous request for said shared teleconference object data is merged with said first request for said shared teleconference object data in said transfer queue so that it is used for transferring said packets to both said second and said third participant system.

14. The method of claim 13 wherein said first participant system placing said request for said shared teleconference object data in said request queue includes creating a transfer queue entry in said transfer queue.

15. The method of claim 11 wherein said transfer queue entry includes a reference to an offset to said shared teleconference data awaiting processing and transferring and an amount of said shared teleconference data remaining to be transferred.

16. The method of claim 15 further comprising the step of determining whether said receiving by said first participant system of said second asynchronous request for said shared teleconference object data from a third participant system has occurred after said processing of some of said packets, and if so, creating a second transfer queue entry which includes a partial request for said shared teleconference object data, wherein said partial request includes a portion of said shared teleconference object data which has already been processed, and subsequent to said first participant system removing said request for said shared teleconference object data from said request queue, said first participant system processing said portion of said shared teleconference object data into packets, a size of each of said packets being said optimal packet size, and said first participant system transferring each of said packets to said third participant system via said transport medium upon completion of processing said portion of said shared teleconference object data into each of said packets.

17. The apparatus of claim 6 wherein said first participant system placing said request for said shared teleconference object data in said request queue includes creating a transfer queue entry in said transfer queue.

18. The apparatus of claim 17 wherein said transfer queue entry includes a reference to an offset to said shared teleconference data awaiting processing and transferring and an amount of said shared teleconference data remaining to be transferred.

19. The apparatus of claim 6 further comprising a means for said first participant system receiving a second asynchronous request for said shared teleconference object data from a third participant system, wherein said second asynchronous request for said shared teleconference object data is merged with said first request for said shared teleconference object data in said transfer queue so that it is used for transferring said packets to both said second and said third participant system.

20. The apparatus of claim 19 wherein said first participant system placing said request for said shared teleconference object data in said request queue includes creating a transfer queue entry in said transfer queue.

21. The apparatus of claim 20 wherein said transfer queue entry includes a reference to an offset to said shared teleconference data awaiting processing and transferring and an amount of said shared teleconference data remaining to be transferred.

22. The apparatus of claim 21 further comprising a means for determining whether said receiving by said first participant system of said second asynchronous request for said shared teleconference object data from a third participant system has occurred after said processing of some of said packets, and if so, creating a second transfer queue entry which includes a partial request for said shared teleconference object data, wherein said partial request includes a portion of said shared teleconference object data which has already been processed, and means operative subsequent to said first participant system removing said request for said shared teleconference object data from said request queue, for said first participant system processing said portion of said shared teleconference object data into packets, a size of each of said packets being said optimal packet size, and a means for said first participant system transferring each of said packets to said third participant system via said transport medium upon completion of processing said portion of said shared teleconference object data into each of said packets.

23. In an electronic conferencing system wherein data is shared between a plurality of participants during an electronic conference, a method of transferring shared teleconference object data among said participants during said electronic conference comprising the following steps:
   a. a first participant system receiving an asynchronous request for said shared teleconference object data from a second participant system;
   b. said first participant system placing said request for said shared teleconference object data in a request queue;
   c. said first participant system rearranging said request for said shared teleconference object data in said request queue with respect to other requests for other shared object data in said request queue if an asynchronous reprioritization request for reprioritization of said request for said shared teleconference object data in said request queue from said second participant system is received by said first participant system;
   d. said first participant system transferring said shared teleconference object data to said second participant system according to a location of said request for said shared teleconference object data in said request queue; and
   e. said first participant system removing said request for said shared teleconference object data from said request queue upon completion of said step of transferring said shared teleconference object dam.

24. The method as claimed in claim 23 wherein said object data includes a binary large object (BLOB).

25. The method as claimed in claim 24 wherein said step of placing said request in a request queue further includes a step of maintaining a transfer queue including an entry for each request for the transfer of one or more BLOBs.

26. The method as claimed in claim 24 further including a step of transferring a BLOB from said first participant system to said second participant system only if a transfer status indicates clear to send.

27. The method as claimed in claim 26 further including a step of reprioritizing said transfer queue if a request for reprioritization is received from a participant.

28. The method of claim 23 wherein said first participant system placing said request for said shared teleconference object data in said request queue includes creating a transfer queue entry in said transfer queue.

29. The method of claim 28 wherein said transfer queue entry includes a reference to an offset to said shared teleconference data awaiting processing and transferring and an amount of said shared teleconference data remaining to be transferred.

30. The method of claim 23 further comprising the step of said first participant system receiving a second asynchronous request for said shared teleconference object data from a third participant system, wherein said second asynchronous request for said shared teleconference object data is merged with said first request for said shared teleconference object data in said transfer queue so that it is used for transferring said shared teleconference object data to both said second and said third participant system.

31. The method of claim 30 wherein said first participant system placing said request for said shared teleconference object data in said request queue includes creating a transfer queue entry in said transfer queue.

32. The method of claim 31 wherein said transfer queue entry includes a reference to an offset to said shared teleconference data awaiting processing and transferring and an amount of said shared teleconference data remaining to be transferred.

33. The method of claim 32 further comprising the step of determining whether said receiving by said first participant system of said second asynchronous request for said shared teleconference object data from a third participant system has occurred after said processing of some of said shared teleconference object data, and if so, creating a second transfer queue entry which includes a partial request for said shared teleconference object data, wherein said partial request includes a portion of said shared teleconference object data which has already been processed, and subsequent to said first participant system removing said request for said shared teleconference object data from said request queue, said first participant system processing said portion of said shared teleconference object data and said first participant system transferring each of said portion of said shared teleconference object data to said third participant system via said transport medium upon completion of processing said portion of said shared teleconference object data.

34. In an electronic conferencing system wherein data is shared between a plurality of participants during an electronic conference, an apparatus for transferring shared teleconference object data among said participants during said electronic conference comprising:
   a. a data request reception circuit for allowing a first participant system to receive an asynchronous request for said shared teleconference object data from a second participant system;
   b. a queue placement circuit for allowing said first participant system placing said request for said shared teleconference object data in a request queue;
   c. a reprioritization circuit for allowing said first participant system to rearrange said request for said shared teleconference object data in said request queue with respect to other requests for other shared object data in said request queue if an asynchronous reprioritization request for reprioritization of said request for said shared teleconference object data in said request queue from said second participant system is received by said first participant system;
   d. a transmission circuit for allowing said first participant system to transfer said shared teleconference object data to said second participant system according to a location of said request for said shared teleconference object data in said request queue; and
   e. a queue deletion circuit for allowing for said first participant system to remove said request for said object data from said request queue upon completion of said step of transferring said shared teleconference object data.

35. The apparatus as claimed in claim 34 wherein said shared teleconference object data is a binary object (BLOB).

36. The apparatus as claimed in claim 35 wherein said queue placement circuit includes transfer queue maintenance circuit for including an entry for each request for the transfer of one or more BLOBs.

37. The apparatus as claimed in claim 35 further including a clear to send detection circuit for transferring said BLOB from said first participant system to said second participant system only if a transfer status indicates clear to send.

38. The apparatus as claimed in claim 37 further including a reprioritizing circuit for reprioritizing said transfer queue if a request for reprioritization is received from a participant.

39. The apparatus of claim 35 wherein said first participant system placing said request for said shared teleconference object data in said request queue includes creating a transfer queue entry in said transfer queue.

40. The apparatus of claim 39 wherein said transfer queue entry includes a reference to an offset to said shared teleconference data awaiting processing and transferring and an amount of said shared teleconference data remaining to be transferred.

41. The apparatus of claim 34 further comprising a circuit for allowing said first participant system to receive a second asynchronous request for said shared teleconference object data from a third participant system, wherein said second asynchronous request for said shared teleconference object data is merged with said first request for said shared teleconference object data in said transfer queue so that it is used for transferring said shared teleconference object data to both said second participant system and said third participant system.

42. The apparatus of claim 41 wherein said first participant system placing said request for said shared teleconference object data in said request queue includes creating a transfer queue entry in said transfer queue.

43. The apparatus of claim 42 wherein said transfer queue entry includes a reference to an offset to said shared teleconference data awaiting processing and transferring and an amount of said shared teleconference data remaining to be transferred.

44. The apparatus of claim 43 further comprising a determination circuit for determining whether said receiving by said first participant system of said second asynchronous request for said shared teleconference object data from a third participant system has occurred after said processing of some of said packets, and if so, creating a second transfer queue entry which includes a partial request for said shared teleconference object data, wherein said partial request includes a portion of said shared teleconference object data which has already been processed, and a removal circuit operative subsequent to said first participant system for removing said request for said shared teleconference object data from said request queue, for said first participant system processing said portion of said shared teleconference object data into packets and a transferring circuit for allowing said first participant system to transfer each of said shared teleconference object data to said third participant system via said transport medium upon completion of processing said portion of said shared teleconference object data.

* * * * *

UNITED STATES PATENT AND TRADEMARK OFFICE
CERTIFICATE OF CORRECTION

PATENT NO.    :    5,452,299
DATED           :    September 19, 1995
INVENTOR(S)  :    Thessin et al.

It is certified that error appears in the above-identified patent and that said Letters Patent is hereby corrected as shown below:

In column 9 at line 3 delete "am" and insert --are--

In column 24 delete "dam." and insert --data.--

Signed and Sealed this

Seventeenth Day of December, 1996

Attest:

BRUCE LEHMAN

*Attesting Officer*     *Commissioner of Patents and Trademarks*